(12) United States Patent
Fu et al.

(10) Patent No.: US 11,490,376 B2
(45) Date of Patent: Nov. 1, 2022

(54) METHODS, BASE STATION, UE AND COMPUTER MEDIUM FOR TRANSMITTING DATA, HARQ-ACK, AND OFDM SYMBOLS

(71) Applicant: Samsung Electronics Co., Ltd., Suwon-si (KR)

(72) Inventors: Jing xing Fu, Beijing (CN); Chen Qian, Beijing (CN); Bin Yu, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 469 days.

(21) Appl. No.: 16/406,260

(22) Filed: May 8, 2019

(65) Prior Publication Data
US 2019/0349898 A1    Nov. 14, 2019

(30) Foreign Application Priority Data

May 9, 2018 (CN) .......................... 201810440460.4

(51) Int. Cl.
*H04W 72/04* (2009.01)
*H04W 74/08* (2009.01)
*H04L 5/00* (2006.01)

(52) U.S. Cl.
CPC ......... *H04W 72/042* (2013.01); *H04L 5/0007* (2013.01); *H04L 5/0055* (2013.01); *H04W 72/044* (2013.01); *H04W 74/0808* (2013.01)

(58) Field of Classification Search
CPC . H04L 27/0006; H04L 5/0007; H04L 5/0055; H04L 5/0091; H04W 72/042;
(Continued)

(56) References Cited

U.S. PATENT DOCUMENTS

2018/0027589 A1*  1/2018  Yang ....................... H04L 25/00
                                                                370/329
2019/0230656 A1*  7/2019  Soriaga ................. H04L 5/0091
(Continued)

FOREIGN PATENT DOCUMENTS

| EP | 3282803 A    | 2/2018 |
| EP | 3 500 011 A1 | 6/2019 |
| WO | 2018/028702 A1 | 2/2018 |

OTHER PUBLICATIONS

Partial Supplementary European Search Report dated Apr. 16, 2021, issued in a counterpart European Application No. 19799802.4-1205 / 3782416.

(Continued)

*Primary Examiner* — Christopher M Crutchfield
*Assistant Examiner* — Jean F Voltaire
(74) *Attorney, Agent, or Firm* — Jefferson IP Law, LLP

(57) ABSTRACT

A method of transmitting data is provided. The method of transmitting data includes transmitting, to a user equipment (UE), information on frequency domain resources of at least one subband on which carrier sensing is to be performed, performing carrier sensing on the at least one subband, and allocating idle resources within one or more subbands to the UE, and transmitting to the UE control information indicating the resources allocated to the UE. The disclosure also provides a method of transmitting a HARQ-ACK, a method of transmitting an OFDM symbol, a base station, a UE, and a computer readable medium.

18 Claims, 25 Drawing Sheets

(58) Field of Classification Search
CPC ........... H04W 72/044; H04W 72/0453; H04W 74/0808
USPC ........................................................ 370/330
See application file for complete search history.

(56) References Cited

U.S. PATENT DOCUMENTS

| | | | | |
|---|---|---|---|---|
| 2019/0273582 | A1* | 9/2019 | Yeo | H04L 1/1887 |
| 2019/0319686 | A1* | 10/2019 | Chen, IV | H04W 72/046 |
| 2019/0364602 | A1* | 11/2019 | Yi | H04W 72/04 |
| 2020/0120482 | A1* | 4/2020 | Parkvall | H04B 7/0452 |
| 2021/0084622 | A1* | 3/2021 | Choi | H04L 1/08 |

OTHER PUBLICATIONS

Extended European Search Report dated Jul. 5, 2021, issued in a counterpart European Application No. 19799802.4-1205/3782416.
LG Electronics: "Consideration on aggregated HARQ-ACK feedback for NR", 3GPP Draft; R1-1707657 NR Aggregated HARQ-ACK Final, 3rd Generation Partnership Project 13GPP), Mobile Competence Centre ; 650, Route Des Lucioles ; F-06921 Sophia-Antipolis Cedex ; France vol. RAN WG1, No. XP051272864, May 14, 2017, Hangzhou.
Qualcomm Incorporated: "TxOP Frame Structure for NR unlicensed", 3GPP Draft; R1-1804829 7.6.2 Frame Structure for NR-U Operation, 3rd Generation Partnership Project (3GPP), Mobile Competence Centre ; 650, Route Des Lucioles ; F-06921 Sophia-Antipolis Cedex; France vol. RAN WG1, No. XP051427095; Apr. 15, 2018, Sanya, China.
Huawei et al., "Numerology and wideband operation in NR unlicensed", R1-1803677, 3GPP TSG RAN WG1 Meeting #92bis, Sanya, China, Apr. 6, 2018.
Huawei et al., "Coexistence and channel access for NR unlicensed band operations", R1-1803679, 3GPP TSG RAN WG1 Meeting #92bis, Sanya, China, Apr. 6, 2018.
VIVO, "Potential solutions and techniques for NR unlicensed spectrum", R1-1801557, 3GPP TSG RAN WG1 Meeting ¥92, Athens, Greece, Feb. 15, 2018.
International Search Report dated Aug. 27, 2019, issued in International Patent Application No. PCT/KR2019/095011.
Ndian Office Action dated Aug. 26, 2022, issued in a counterpart Indian Application No. 202037051697.

* cited by examiner

METHODS, BASE STATION, UE AND COMPUTER MEDIUM FOR TRANSMITTING DATA, HARQ-ACK, AND OFDM SYMBOLS

CROSS-REFERENCE TO RELATED APPLICATION(S)

This application is based on and claims priority under 35 U.S.C. § 119(a) of a Chinese patent application number 201810440460.4, filed on May 9, 2018, in the China National Intellectual Property Administration, the disclosure of which is incorporated by reference herein in its entirety.

BACKGROUND

1. Field

The disclosure relates to the field of wireless communication technologies. More particularly, the disclosure relates to a method of transmitting data, a method of transmitting a hybrid automatic repeat request acknowledgement (HARQ-ACK), and a method of transmitting an orthogonal frequency division multiplexing (OFDM) symbol, and a corresponding base station, user equipment (UE) and computer readable medium.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

Other aspects, advantages, and salient features of the disclosure will become apparent to those skilled in the art from the following detailed description, which, taken in conjunction with the annexed drawings, discloses various embodiments of the disclosure.

SUMMARY

Aspects of the disclosure are to address at least the above-mentioned problems and/or disadvantages and to provide at least the advantages described below. Accordingly, an aspect of the disclosure is to provide the following solutions to at least overcome the deficiencies of the prior art.

Additional aspects will be set forth in part in the description which follows and, in part, will be apparent from the description, or may be learned by practice of the presented embodiments.

In accordance with an aspect of the disclosure, a method of transmitting data is provided. The method includes transmitting, to a user equipment (UE), information on frequency domain resources of at least one subband on which carrier sensing is to be performed, performing carrier sensing on the at least one subband, allocating idle resources in one or more subbands to the UE, and transmitting, to the UE, control information indicating the resources allocated to the UE.

In embodiments of the disclosure, the subband on which the carrier sensing is to be performed has a bandwidth in a basic unit of N physical resource blocks (PRBs), wherein N is a positive integer.

In embodiments of the disclosure, the bandwidth of the subband on which the carrier sensing is to be performed is determined according to one of approaches, in which the number N of PRBs included in the basic unit of the bandwidth of the subband on which the carrier sensing is to be performed is preset by a protocol, and a subcarrier spacing of the PRB is determined according to a reference subcarrier spacing, the number N of PRBs included in the basic unit of the bandwidth of the subband on which the carrier sensing is to be performed is preset by a protocol, and a subcarrier spacing of the PRB is a subcarrier spacing of a carrier or a bandwidth part (BWP) which is a part of the carrier where the subband on which the carrier sensing is to be performed is located, the number N of PRBs included in the basic unit of the bandwidth of the subband on which the carrier sensing is to be performed is configured by a higher layer signaling, and a subcarrier spacing of the PRB is determined according to a reference subcarrier spacing, the number N of PRBs included in the basic unit of the bandwidth of the subband on which the carrier sensing is to be performed is configured by a higher layer signaling, and a subcarrier spacing of the PRB is a subcarrier spacing of a carrier or a BWP where the subband on which the carrier sensing is to be performed is located, the number N of PRBs included in the basic unit of the bandwidth of the subband on which the carrier sensing is to be performed is determined by a predetermined correspondence between the number of PRBs configured by a higher layer signaling and the bandwidth of the subband on which the carrier sensing is to be performed, and a subcarrier spacing of the PRB is a subcarrier spacing of a carrier or a BWP where the subband on which the carrier sensing is to be performed is located, the number N of PRBs included in the basic unit of the bandwidth of the subband on which the carrier sensing is to be performed is the same as the number of PRBs in a resource block group (RBG) used for resource allocation in the subband, wherein the RBG is a basic unit of frequency domain resource allocation.

In embodiments of the disclosure, the RBG is determined according to one of approaches, in which the RBG is in a basic unit of a subband on which the carrier sensing is to be performed, wherein PRBs in the RBG are in a single one subband on which the carrier sensing is to be performed, the RBG is in a basic unit of a carrier or a BWP, wherein PRBs in the RBG may be in different subbands on which the carrier sensing is to be performed.

In embodiments of the disclosure, a bandwidth of the subband on which the carrier sensing is to be performed is predetermined, and in the case where the bandwidth of the subband on which the carrier sensing is to be performed is not an integer multiple of PRBs, the PRB is allocated according to one of the followings a PRB located across two subbands on which the carrier sensing is to be performed respectively is not allocated, and it is determined whether a PRB located in a single one subband can be allocated according to a carrier sensing result of this subband, it is determined whether a PRB located across two subbands on which the carrier sensing is to be performed respectively can be allocated according to carrier sensing results of the two subbands, and it is determined whether a PRB located in a single one subband can be allocated according to a carrier sensing result of this subband.

In embodiments of the disclosure, allocating idle resources in one or more subbands to the UE includes separately allocating resources of individual subbands on which the carrier sensing is to be performed in a carrier or a BWP which is a part of the carrier, or jointly allocating resources of individual subbands on which the carrier sensing is to be performed in a carrier or a BWP, or determining whether to separately or jointly allocate resources of individual subbands on which the carrier sensing is to be performed in a carrier or a BWP by a higher layer signaling configuration, or determining whether to separately or jointly allocate resources of individual subbands on which the carrier sensing is to be performed in a carrier or a BWP by different downlink carrier information (DCI) formats.

In embodiments of the disclosure, in the case that resources are jointly allocated, relative positions of the resources allocated in the individual subbands on which the carrier sensing is to be performed in a carrier or a BWP are the same, or the resources of the individual subbands on which the carrier sensing is to be performed in a carrier or a BWP are allocated as a whole band.

In embodiments of the disclosure, data to be transmitted are mapped to the allocated resources in an order of time domain first and frequency domain next.

In accordance with another aspect of the disclosure, a method of transmitting data is provided. The method includes, receiving, from a base station, information on frequency domain resources of at least one subband on which the carrier sensing is to be performed by the base station, and receiving control information transmitted from the base station, the control information indicating idle resources in one or more subbands allocated by the base station to a UE.

In embodiments of the disclosure, the subband on which the carrier sensing is to be performed has a bandwidth in a basic unit of N PRBs, wherein N is a positive integer.

In embodiments of the disclosure, the bandwidth of the subband on which the carrier sensing is to be performed is determined according to one of approaches, in which the number N of PRBs included in the basic unit of the bandwidth of the subband on which the carrier sensing is to be performed is preset by a protocol, and a subcarrier spacing of the PRB is determined according to a reference subcarrier spacing, the number N of PRBs included in the basic unit of the bandwidth of the subband on which the carrier sensing is to be performed is preset by a protocol, and a subcarrier spacing of the PRB is a subcarrier spacing of a carrier or a Bandwidth Part (BWP) which is a part of the carrier where the subband on which the carrier sensing is to be performed is located, the number N of PRBs included in the basic unit of the bandwidth of the subband on which the carrier sensing is to be performed is configured by a higher layer signaling, and a subcarrier spacing of the PRB is determined according to a reference subcarrier spacing, the number N of PRBs included in the basic unit of the bandwidth of the subband on which the carrier sensing is to be performed is configured by a higher layer signaling, and a subcarrier spacing of the PRB is a subcarrier spacing of a carrier or a BWP where the subband on which the carrier sensing is to be performed is located, the number N of PRBs included in the basic unit of the bandwidth of the subband on which the carrier sensing is to be performed is determined by a predetermined correspondence between the number of PRBs configured by a higher layer signaling and the bandwidth of the subband on which the carrier sensing is to be performed, and a subcarrier spacing of the PRB is a subcarrier spacing of a carrier or a BWP where the subband on which the carrier sensing is to be performed is located, the number N of PRBs included in the basic unit of the bandwidth of the subband on which the carrier sensing is to be performed is the same as the number of PRBs in a RBG used for resource allocation in the subband, wherein the RBG is a basic unit of frequency domain resource allocation.

In embodiments of the disclosure, the RBG is determined according to one of approaches, in which the RBG is in a basic unit of a subband on which the carrier sensing is to be performed, wherein PRBs in the RBG are in a single one subband on which the carrier sensing is to be performed, the RBG is in a basic unit of a carrier or a BWP, wherein PRBs in the RBG may be in different subbands on which the carrier sensing is to be performed.

In embodiments of the disclosure, a bandwidth of the subband on which the carrier sensing is to be performed is predetermined, and in a case where the bandwidth of the subband on which the carrier sensing is to be performed is not an integer multiple of PRBs, the PRB is allocated according to one of approaches, in which a PRB located across two subbands on which the carrier sensing is to be performed respectively is not allocated, and it is determined whether a PRB located in a single one subband can be allocated according to a carrier sensing result of this subband, it is determined whether a PRB located across two subbands on which the carrier sensing is to be performed respectively can be allocated according to carrier sensing results of the two subbands, and it is determined whether a PRB located in a single one subband can be allocated according to a carrier sensing result of this subband.

In embodiments of the disclosure, the idle resources in one or more subbands allocated by the base station to the UE are determined according to one of approaches, in which resources of individual subbands on which the carrier sensing is to be performed in a carrier or a BWP which is a part of the carrier are separately allocated by the base station, resources of individual subbands on which the carrier sensing is to be performed in a carrier or a BWP are jointly allocated by the base station, it is determined whether to separately or jointly allocate resources of individual subbands on which the carrier sensing is to be performed in a carrier or a BWP by receiving a higher layer signaling configuration from the base station, it is determined whether to separately or jointly allocate resources of individual subbands on which the carrier sensing is to be performed in a carrier or a BWP by receiving different DCI formats from the base station.

In embodiments of the disclosure, in a case that the resources are jointly allocated, relative positions of the resources allocated in the individual subbands on which the carrier sensing is to be performed in a carrier or a BWP are the same, or the resources of the individual subbands on which the carrier sensing is to be performed in a carrier or a BWP are allocated as a whole band.

In embodiments of the disclosure, data are received from the allocated resources in an order of time domain first and frequency domain next.

In accordance with another aspect of the disclosure, a method of transmitting a hybrid automatic repeat request acknowledgement (HARQ-ACK) is provided. The method includes, configuring, for one and the same downlink slot group, a set of a plurality of HARQ-ACK transmission time units for a UE, such that the UE can transmit a HARQ-ACK corresponding to the downlink slot group on one or more HARQ-ACK transmission time units in the set, and transmitting a configuration of the set to the UE.

In accordance with another aspect of the disclosure, a method of transmitting a HARQ-ACK is provided. The method includes receiving, from a base station, a configuration of a set of a plurality of HARQ-ACK transmission time units, wherein a HARQ-ACK transmitted on the plurality of HARQ-ACK transmission time units in the set is corresponding to the same downlink slot group, transmitting a HARQ-ACK on one or more HARQ-ACK transmission time units in the set according to the received configuration.

In embodiments of the disclosure, the method further includes sequentially performing carrier sensing in the HARQ-ACK transmission time units in the set before transmitting the HARQ-ACK.

In embodiments of the disclosure, transmitting the HARQ-ACK further includes if a carrier sensing result of a first HARQ-ACK transmission time unit in the set is idle, transmitting the HARQ-ACK on the first HARQ-ACK transmission time unit without performing carrier sensing in subsequent HARQ-ACK transmission time units, if the carrier sensing result of the first HARQ-ACK transmission time unit is busy, performing carrier sensing in a next HARQ-ACK transmission time unit until a HARQ-ACK transmission time unit whose carrier sensing result is idle is found to transmit the HARQ-ACK without performing carrier sensing in subsequent HARQ-ACK transmission time units, if the carrier sensing result is busy up to a last HARQ-ACK transmission time unit in the set, not transmitting the HARQ-ACK, or repeatedly transmitting the HARQ-ACK on a HARQ-ACK transmission time unit in the set whose carrier sensing result is idle and all subsequent HARQ-ACK transmission time units in the set.

In accordance with another aspect of the disclosure, a method of transmitting an orthogonal frequency division multiplexing (OFDM) symbol is provided. The method includes generating control information, the control information including slot format information (SFI) indicating that the OFDM symbol is one of an uplink OFDM symbol, a downlink OFDM symbol, a first type of flexible OFDM symbol, and a second type of flexible OFDM symbol, wherein the second flexible OFDM symbol is used to transmit a downlink control channel or a wake-up signal (WUS) without additional indication information indicating that the OFDM symbol is an uplink OFDM symbol or a downlink OFDM symbol, and transmitting the control information to a UE.

In accordance with another aspect of the disclosure, a method of transmitting an OFDM symbol is provided. The method includes, receiving control information from a base station, the control information including SFI indicating that the OFDM symbol is one of an uplink OFDM symbol, a downlink OFDM symbol, a first type of flexible OFDM symbol, and a second type of flexible OFDM symbol, and receiving a downlink control channel or a—WUS in the OFDM symbol if the SFI indicates that the OFDM symbol is a second type of flexible OFDM symbol and there is no additional indication information indicating that the OFDM symbol is an uplink OFDM symbol or a downlink OFDM symbol.

In accordance with another aspect of the disclosure, a base station is provided. The base station includes, a processor, and a memory having computer executable instructions stored thereon, the instructions, when executed by the processor, cause the base station to perform the method of any of the first, third and fifth aspects of the disclosure.

In accordance with another aspect of the disclosure, a UE is provided. The UE includes, a processor, and a memory having computer executable instructions stored thereon, the instructions, when executed by the processor, cause the UE to perform the method of any of the second, fourth and sixth aspects of the disclosure.

In accordance with another aspect of the disclosure, a computer readable medium having instructions stored thereon, the instructions, when executed by a processor, cause the processor to perform the method of any of the first, third and fifth aspects of the disclosure is provided.

In accordance with another aspect of the disclosure, a computer readable medium having instructions stored thereon, the instructions, when executed by a processor, cause the processor to perform the method of any of the second, fourth and sixth aspects of the disclosure is provided.

The above technical solutions of the disclosure may at least obtain the following beneficial effects.

By performing carrier sensing on subbands within the carrier bandwidth, i.e., performing the carrier sensing in units of subbands, the resources in the subbands whose carrier sensing result is idle may be utilized. The unlicensed spectrum may be better utilized, and the chance of utilizing the carrier is improved, thereby increasing spectrum utilization and providing a larger throughput for the UE.

By configuring a set of a plurality of HARQ-ACK transmission time units for the UE, it is possible to increase the transmission opportunity of the HARQ-ACK.

By providing a fourth OFDM symbol type, it is possible to increase the chances of utilizing resources in the unlicensed band.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
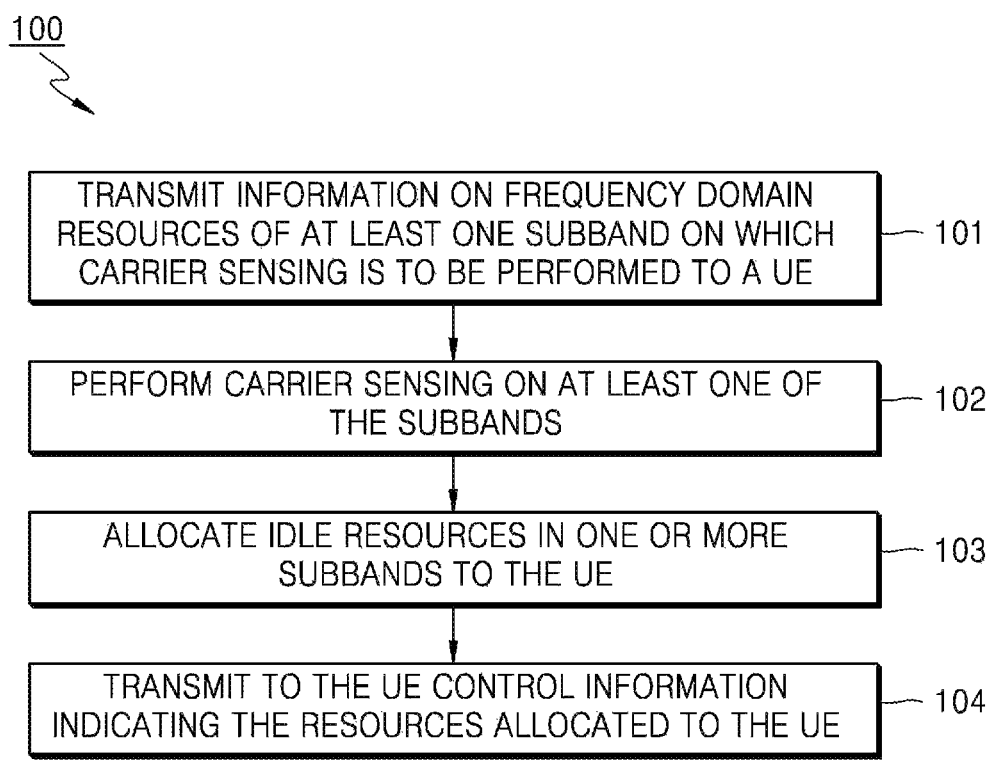
FIG. 1 schematically illustrates a flowchart of a method of transmitting data performed on a base station side according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The technical solutions in the embodiments of the disclosure will be clearly and completely described below in conjunction with the drawings in the embodiments of the disclosure.

A plurality of operations are performed in a particular order in the flow of the description of the disclosure and the claims and the above-described figures, but it should be appreciated that these operations may not execute or execute in parallel in the order in which they appear herein. The serial number of the operation such as 101, 102, etc., is only used to distinguish different operations, and the serial number itself does not represent any execution order. Additionally, these processes may include more or fewer operations, and these operations may be performed sequentially or in parallel. It should be noted that the phrase "first" and "second" used herein are used to distinguish different messages, devices, modules, etc., do not represent the order, and does not define that the "first" and "second" elements are of different types.

The technical solutions in the embodiments of the disclosure are clearly and completely described in the following with reference to the accompanying drawings in the embodiments of the disclosure. It is obvious that the described embodiments are only a part of the embodiments of the disclosure, and not all of the embodiments. All other embodiments obtained by a person skilled in the art according to the embodiments of the disclosure without creative efforts are within the scope of the disclosure.

The method of transmitting data provided by the disclosure may be applied to a shared band or an unlicensed band. A device (including the base station and the user equipment (UE)) performs carrier sensing before transmitting data, and the device may only transmit data if the carrier sensing result is idle. If the carrier sense result is busy, the device is not allowed to transmit data. The method provided by the disclosure may be applied to downlink data transmission, that is, the base station transmits data and the UE receives data. At this time, the base station performs carrier sensing. The method provided by the disclosure may also be applied to uplink data transmission, that is, the UE transmits data and the base station receives data. At this time, the UE performs carrier sensing. The following embodiments take the downlink data transmission as an example. The uplink data transmission may be implemented according to the embodiments.

One carrier (also referred to as a serving cell) of the disclosure may be divided into at least one subband, or one bandwidth part (BWP) (a part of a carrier) may be divided into at least one subband. Carrier sensing is performed on each subband separately, and data transmission in each subband is determined according to the carrier sensing result of this subband.

In the new radio (NR) air interface system, a bandwidth of a carrier is relatively large. Some UEs have a limited bandwidth capability, and may only transmit or receive control information and data within a part of the bandwidth of the carrier, while some UEs have a relatively strong bandwidth capability and may transmit or receive control information and data within the entire bandwidth of the carrier. The bandwidth capability of a UE referred to herein refers to the maximum bandwidth at which the UE may simultaneously receive or transmit data in the frequency domain. For example, some UEs have a bandwidth capability of 20 megahertz (MHz), and some UEs have a bandwidth capability of 5 megahertz. For a UE with a poor bandwidth capability, in order to improve the frequency diversity performance of the UE, the UE may operate in a limited band with good performance (known as a BWP, which is a part of the carrier) at different times. That is, the UE may receive and transmit control information and data within different BWPs at different times.

As the contradiction between the UE's demand for broadband wireless services and the scarcity of spectrum resources increases, mobile operators have begun to consider the non-licensed band (also known as the unlicensed band) as a supplement to the licensed band. The 3rd Generation Partnership Project (3GPP) has agreed a scheme of efficient carrier aggregation of unlicensed bands and licensed bands, which effectively improves the spectrum utilization of the whole network while ensuring no significant impact on other technologies in the unlicensed band.

Unlicensed bands have generally been allocated for some other purposes, such as radar or 802.11 series Wireless Fidelity (WiFi). In this way, the interference level is undefined in the unlicensed band, which makes it different to guarantee the quality of service (QoS) of long term evolution (LTE) transmission. However, the unlicensed band may be used for data transmission with low QoS requirements. Here, a LTE system of a secondary cell deployed on the unlicensed band is referred to as a licensed assisted access (LAA) system. In the unlicensed band, how to avoid interference between the LAA system and other wireless systems such as radar or WiFi is a key issue. Carrier sensing is a collision avoidance mechanism commonly used in unlicensed bands. A mobile station (STA) must listen to the radio channel before transmitting a signal, and may only occupy the radio channel to transmit a signal when it detects that the radio channel is idle. The LAA also follows a similar mechanism to ensure less interference with other signals. An LAA device (base station or terminal) dynamically switches according to the carrier sensing result, that is, it transmits if the channel is detected to be idle, and does not transmit if the channel is detected to be busy. In the LTE LAA system, the bandwidth of the base station performing carrier sensing is the bandwidth of the carrier, and the bandwidth capability of all UEs is greater than or equal to the bandwidth of the carrier. Therefore, all UEs perform carrier sensing on the entire bandwidth of the carrier.

Since the bandwidth of the carrier is relatively large in the NR system, performing carrier sensing over the entire carrier bandwidth reduces the chance of utilizing the carrier. This is because perhaps part of the entire carrier bandwidth is busy while other parts are idle and the carrier sensing result of the entire carrier bandwidth may be busy, resources within the entire carrier bandwidth cannot be utilized, and thus spectrum utilization is lower.

In addition, in the unlicensed band, the UE performs carrier sensing before transmitting the hybrid automatic repeat request acknowledgement (HARQ-ACK) on the physical uplink control channel (PUCCH) or the physical uplink shared channel (PUSCH). If the carrier sensing result is idle, the UE transmits the HARQ-ACK. If the carrier sensing result is busy, the UE is not allowed to transmit the HARQ-ACK. If a fixed timing relationship is followed, the HARQ-ACK will not be transmitted.

In addition, in the new radio (NR) air interface system, in order to reduce the delay of the service transmission, the frame structure is more flexible. Each slot may be a downlink slot, an uplink slot, and an uplink and downlink mixed slot. All orthogonal frequency division multiplexing (OFDM) symbols in a downlink slot are all downlink OFDM symbols, all OFDM symbols in an uplink slot are all uplink OFDM symbols, and the uplink and downlink mixed slot includes both uplink OFDM symbols and downlink OFDM symbols. In order to better satisfy the requirements of the uplink and downlink traffics of the UE, the base station (e.g., gNB) dynamically notifies the UE of the frame format by Slot Format Information (SFI). The downlink OFDM symbol in the slot is denoted as "D", the uplink OFDM symbol in the slot is denoted as "U", and the flexible OFDM symbol in the slot is denoted as "X". The existing SFI format is shown in Table 1.

TABLE 1

Time Slot Format For Normal Cyclic Prefix

| Format | \multicolumn{14}{c}{OFDM Symbol In Slot} |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0  | D | D | D | D | D | D | D | D | D | D | D | D | D | D |
| 1  | U | U | U | U | U | U | U | U | U | U | U | U | U | U |
| 2  | X | X | X | X | X | X | X | X | X | X | X | X | X | X |
| 3  | D | D | D | D | D | D | D | D | D | D | D | D | D | X |
| 4  | D | D | D | D | D | D | D | D | D | D | D | D | X | X |
| 5  | D | D | D | D | D | D | D | D | D | D | D | X | X | X |
| 6  | D | D | D | D | D | D | D | D | D | D | X | X | X | X |
| 7  | D | D | D | D | D | D | D | D | D | X | X | X | X | X |
| 8  | X | X | X | X | X | X | X | X | X | X | X | X | X | U |
| 9  | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | U | D | D | D | D | D | X | D | U |
| 47 | D | D | X | U | U | U | U | D | D | X | U | U | U | U |
| 48 | D | X | U | U | U | U | D | X | U | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | D | D | D | D | D | D | D | D |
| 55 | D | D | X | X | X | U | U | U | D | D | D | D | D | D |
| 56-255 | \multicolumn{14}{c}{reserved} |

The UE may determine the type of the OFDM symbol in a slot by receiving the dynamic SFI in the downlink control information (DCI) in the common search space. The UE may receive a physical downlink control channel (PDCCH), a physical downlink shared channel (PDSCH), and a downlink reference signal (for example, channel state information-reference signal (CSI-RS)) in the downlink OFDM symbol indicated by the dynamic SFI. The UE may transmit a PUCCH, a Physical Uplink Shared Channel (PUSCH), and an uplink reference signal (for example, sounding reference signal (SRS)) in an uplink OFDM symbol indicated by the dynamic SFI. Except for the downlink OFDM symbol or the uplink OFDM symbol indicated by the DCI for allocating a PDSCH or PUSCH, the UE neither receives the PDCCH, the PDSCH and the downlink reference signal, nor transmits the PUCCH, PUSCH and uplink reference signals in the flexible OFDM symbol indicated by the dynamic SFI.

On the unlicensed band, if an OFDM symbol indicated by the dynamic SFI which is transmitted by the base station cannot be a downlink OFDM symbol before the carrier sensing result is idle, the OFDM symbol indicated by the dynamic SFI which is transmitted by the base station is a flexible OFDM symbol. Therefore, the UE cannot receive PDCCH in such OFDM symbols. Even if the carrier sensing result of the base station is idle before the next SFI transmission, the base station cannot transmit the PDCCH because the UE does not receive the PDCCH in such OFDM symbols, which may reduce the chance of utilizing the unlicensed band.

A flowchart of a method of transmitting downlink data performed on a base station side according to an embodiment of the disclosure will be specifically described below with reference to FIG. 1.

FIG. 1 schematically illustrates a flow chart of a method 100 for transmitting downlink data performed at a base station side according to an embodiment of the disclosure.

Referring to FIG. 1, method 100 may include operations 101, 102, 103, and 104.

In Operation 101, the base station transmits, to a UE, information on frequency domain resources of at least one subband on which the carrier sensing is to be performed.

In an embodiment, the information may include a bandwidth and a location of the frequency domain resource of at least one subband on which the carrier sensing is to be performed, which may be determined in accordance with one of Modes 1-6 described below.

In an embodiment of the disclosure, the base station may transmit, to the UE, information on the bandwidth and the location of the frequency domain resource of the at least one subband on which the carrier sensing is to be performed by signaling including: a higher layer signaling configuration (UE-specific higher layer signaling configuration or cell common higher layer signaling configuration), system information or protocol presetting, or physical layer signaling. In the application, the physical layer signaling refers to information in DCI.

In an embodiment of the disclosure, the base station determines that the bandwidth of the subband on which the carrier sensing is to be performed in a basic unit of N (N is a positive integer) physical resource blocks (PRBs). That is, the bandwidth of the subband on which the carrier sensing is to be performed is an integer multiple of N PRBs. The advantage is that each PRB is determined to be idle or not based on the carrier sensing result of only one subband, and the case does not occur that one PRB is determined to be idle or not according to the carrier sensing result of two adjacent subbands. For example, the bandwidth of the subband on which the carrier sensing is to be performed is in a basic unit of 2 PRBs, the bandwidth of the carrier is 40 MHz (megahertz), the subcarrier spacing is 15 kHz, and each carrier includes 220 PRBs. The bandwidth of each subband on which the carrier sensing is to be performed includes 55 basic units, 2*55=110 PRBs.

Figure 2:
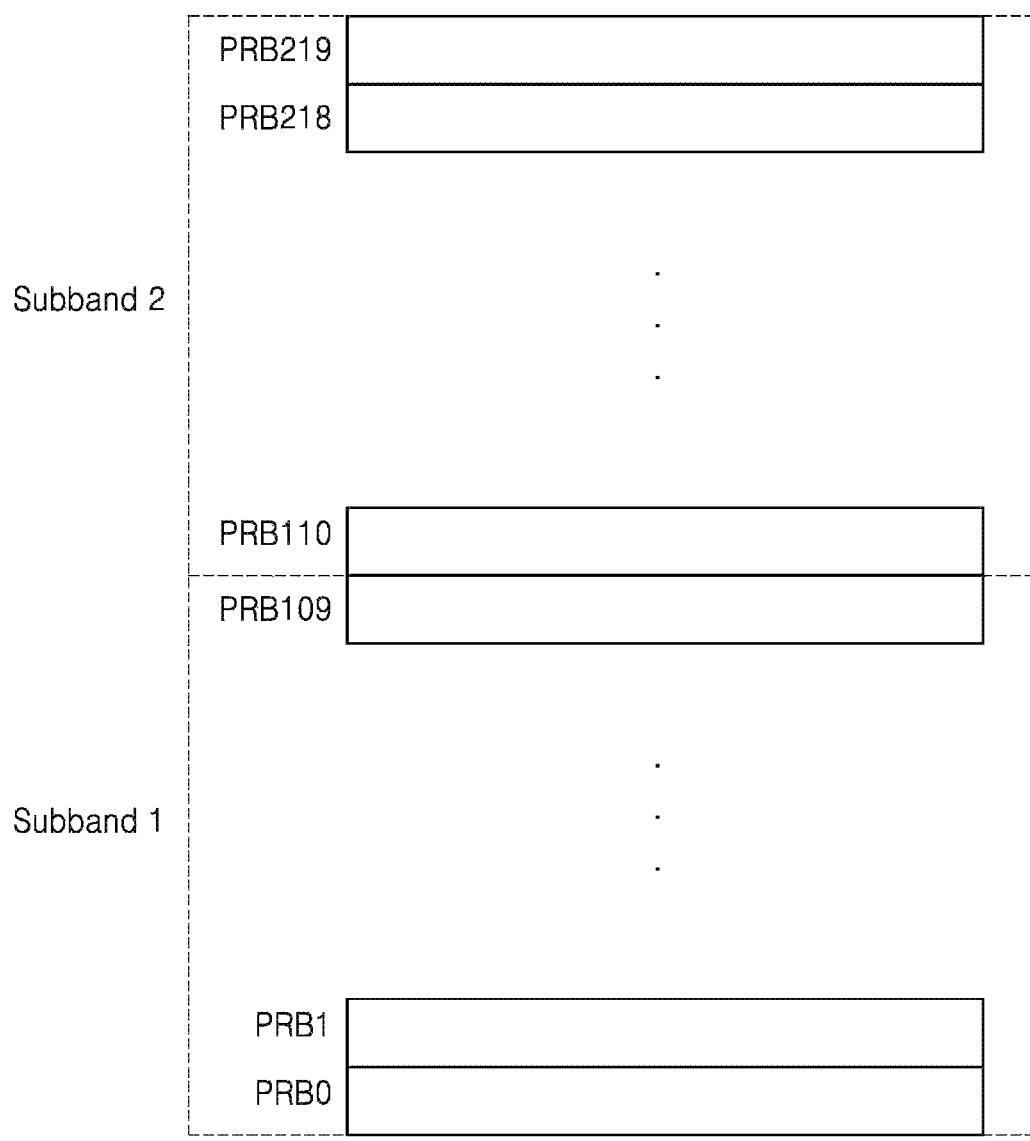
FIG. 2 schematically illustrates a diagram of a bandwidth of subbands on which the carrier sensing is to be performed according to an embodiment of the disclosure.

FIG. 2 schematically illustrates a diagram of a bandwidth of subbands on which the carrier sensing is to be performed according to an exemplary embodiment of the disclosure.

Referring to FIG. 2, the first subband includes PRB0 to PRB109, and the second subband includes PRB110 to PRB219. The two adjacent subbands are continuous, and there is no guard band between the two adjacent subbands. The bandwidth of the subband on which the carrier sensing is to be performed in this scheme is 110 PRBs, i.e., 19.8 MHz. The bandwidth of the carrier sensing in LAA and WiFi is 20 MHz. This scheme has a small deviation from the bandwidth of the carrier sensing in LAA and WiFi. The scheme may be extended to more than two subbands, in which two adjacent subbands are continuous and there is no guard band between the two adjacent subbands.

The number of PRBs included in a basic unit of the bandwidth of the subband on which the carrier sensing is to be performed may be determined according to one of the following modes, thereby determining the bandwidth of the subband on which the carrier sensing is to be performed, and PRBs in each subband are allocated for data transmission according to the carrier sensing result of the subband.

Mode One:

The number N (for example, N is M power of 2, and M is a non-negative integer, that is, N is equal to 1, 2, 4, 8, 16, etc.) of PRBs included in the basic unit of the bandwidth of the subband on which the carrier sensing is to be performed is preset by the protocol, and the subcarrier spacing of the PRB is determined according to a reference subcarrier spacing (the reference subcarrier spacing is preset by the protocol or by the higher layer signaling, or the reference subcarrier spacing is determined according to the frequency band, for example, the reference subcarrier spacing for the frequency band below 6 GHz is 60 kHz, the reference subcarrier spacing for the frequency band above 6 GHz is 120 kHz, and one PRB includes 12 subcarriers). By reasonably determining the number N of PRBs included in the basic unit of the bandwidth of the subband on which the carrier sensing is to be performed, the basic unit of frequency domain resource allocation is a subset of the basic unit of the bandwidth of the subband on which the carrier sensing is to be performed, which is convenient for indication of the frequency domain resource allocation.

For example, if the value of N is 16, and the reference subcarrier spacing is 480 kHz, the basic unit of the bandwidth of the subband on which the carrier sensing is to be performed is 16*12*480=92160 kHz=92.16 MHz. When the actual subcarrier spacing is not 480 kHz, the basic unit of the bandwidth of the subband on which the carrier sensing is to be performed is still 92.16 MHz. For example, when the subcarrier spacing is 240 kHz, the basic unit of the bandwidth of the subband on which the carrier sensing is to be performed is still determined according to the reference subcarrier spacing, i.e., 92.16 MHz. The basic unit of the bandwidth of the subband on which the carrier sensing is to be performed actually includes 32 PRBs with a subcarrier spacing of 240 kHz.

Alternatively, if the value of N is 16, and the reference subcarrier spacing is 15 kHz, the basic unit of the bandwidth of the subband on which the carrier sensing is to be performed is 16*12*15=2880 kHz=2.88 MHz. When the actual subcarrier spacing is not 15 kHz, the basic unit of the bandwidth of the subband on which the carrier sensing is to be performed is still 2.88 MHz. For example, when the subcarrier spacing is 30 kHz, the basic unit of the bandwidth of the subband on which the carrier sensing is to be performed is also determined according to the reference subcarrier spacing, i.e., 2.88 MHz. The basic unit of the bandwidth of the subband on which the carrier sensing is to be performed actually includes 8 PRBs with a subcarrier spacing of 30 kHz.

Mode Two:

The number N (for example, N is M power of 2, and M is a non-negative integer, that is, N is equal to 1, 2, 4, 8, 16, etc.) of PRBs included in the basic unit of the bandwidth of the subband on which the carrier sensing is to be performed is preset by the protocol, and a subcarrier spacing of the PRB is the subcarrier spacing of a carrier or a BWP where the subband on which the carrier sensing is to be performed is located. By reasonably determining the number N of PRBs included in the basic unit of the bandwidth of the subband on which the carrier sensing is to be performed, the basic unit of frequency domain resource allocation is a subset of the basic unit of the bandwidth of the subband on which the carrier sensing is to be performed, which is convenient for indication of the frequency domain resource allocation.

For example, if the value of N is 16, and the subcarrier spacing of the carrier or the BWP where the subband is located is 480 kHz, the basic unit of the bandwidth of the subband on which the carrier sensing is to be performed is 16*12*480=92160 kHz=92.16 MHz.

Alternatively, if the value of N is 16, and the subcarrier spacing of the carrier or the BWP where the subband is located is 15 kHz, the basic unit of the bandwidth of the subband on which the carrier sensing is to be performed is 16*12*15=2880 kHz=2.88 MHz. In this way, the basic unit of the bandwidth of the subband on which the carrier sensing is to be performed is based on the subcarrier spacing of the actual PRB of the subband, which is more convenient for indication of the frequency domain resource allocation.

Mode Three:

The number N (for example, N is M power of 2, and M is a non-negative integer, that is, N is equal to 1, 2, 4, 8, 16, etc.) of PRBs included in the basic unit of the bandwidth of the subband on which the carrier sensing is to be performed is configured by the higher layer signaling, and a subcarrier spacing of the PRB is determined according to a reference subcarrier spacing (the referenced subcarrier spacing is preset by the protocol or configured by a higher layer signaling). For example, if the value of N is 16, and the reference subcarrier spacing is 480 kHz, the basic unit of the bandwidth of the subband on which the carrier sensing is to be performed is 16*12*480=92160 kHz=92.16 MHz; or, the value of N is 16, and the reference subcarrier spacing is 15 kHz, the basic unit of the bandwidth of the subband on which the carrier sensing is to be performed is 16*12*15=2880 kHz=2.88 MHz. The subcarrier spacing of the subband may be different from the reference subcarrier spacing.

Mode Four:

The number N (for example, N is M power of 2, and M is a non-negative integer, that is, N is equal to 1, 2, 4, 8, 16, etc.) of PRBs included in the basic unit of the bandwidth of the subband on which the carrier sensing is to be performed is configured by the higher layer signaling, and a subcarrier spacing of the PRB is a subcarrier spacing of a carrier or a BWP where the subband on which the carrier sensing is to be performed is located. For example, if the value of N is 16, and the subcarrier spacing of the carrier or the BWP where the subband is located is 480 kHz, the basic unit of the bandwidth of the subband on which the carrier sensing is to be performed is 16*12*480=92160 kHz=92.16 MHz; or, if the value of N is 16, and the subcarrier spacing of the carrier or BWP where the subband is located is 15 kHz, the basic unit of the bandwidth of the subband on which the carrier sensing is to be performed is 16*12*15=2880 kHz=2.88 MHz.

Mode Five:

The number N (for example, N is M power of 2, and M is a non-negative integer, that is, N is equal to 1, 2, 4, 8, 16, etc.) of PRBs included in the basic unit of the bandwidth of the subband on which the carrier sensing is to be performed is determined by a predetermined correspondence between the number of PRBs configured by the higher layer signaling and the bandwidth of the subband on which the carrier sensing is to be performed (or the bandwidth of the carrier where the subband is located, or the bandwidth of the BWP where the subband is located), wherein a subcarrier spacing of the PRB is a subcarrier spacing of a carrier or a BWP where the subband on which the carrier sensing is to be performed is located.

For example, if the bandwidth of the BWP (or the bandwidth of the carrier, or the bandwidth of the subband) is B1, the number of PRBs configured by the higher layer signaling is N1 or N2, and if the bandwidth of the BWP is B2, the number of PRBs configured by the higher layer signaling is N3 or N4, where B1, B2, N1, N2, N3, N4 are determined by the protocol, as shown in Table 2.

TABLE 2

| BWP bandwidth | configuration 1 | configuration 2 |
|---|---|---|
| B1 | N1 | N2 |
| B2 | N3 | N4 |

Mode Six:

The number N of PRBs included in the basic unit of the bandwidth of the subband on which the carrier sensing is to be performed is the same as the number of PRBs in a resource block group (RBG) used for resource allocation in the subband, wherein the RBG is a basic unit of frequency domain resource allocation.

For example, a carrier has a bandwidth of 40 MHz and a subcarrier spacing of 15 kHz, including 220 PRBs. An RBG has a size of 8 PRBs. That is, there are 28 RBGs in total, of which 27 RBGs each include 8 PRBs, and one RBG includes 4 PRBs. The number N of PRBs included in the basic unit of the bandwidth of the subband on which the carrier sensing is to be performed is 8, wherein the bandwidth of one subband includes 14 basic units with each basic unit having 8 PRBs, i.e., a total of 14*8=112 PRBs, and the bandwidth of another subband includes 13 basic units with each basic unit having 8 PRBs and one basic unit having 4 PRBs, i.e., 13*8+4=108 PRBs in total.

Alternatively, for example, a carrier has a bandwidth of 40.2 MHz and a subcarrier spacing of 15 kHz, including 224 PRBs. An RBG has a size of 8 PRBs. That is, there are 28 RBGs in total, each RBG including 8 PRBs. The number of PRBs included in the basic unit of the bandwidth of the subband on which the carrier sensing is to be performed is 8, wherein the bandwidth of one subband includes 14 basic units with each basic unit having 8 PRBs, i.e., a total of 14*8=112 PRBs, and the bandwidth of another subband includes 14 basic units with each basic unit having 8 PRBs, i.e., a total of 14*8=112 PRBs.

Alternatively, for example, a carrier has a bandwidth of 40 MHz and a subcarrier spacing of 15 kHz. The carrier includes two subbands, and each subband has a bandwidth of 20 MHz. None of PRBs belongs to two subbands. That is, each PRB belongs to a single one subband. For example, a carrier with a bandwidth of 40 MHz includes 220 PRBs, and each subband includes 110 PRBs. The indexes of the PRBs of the first subband are PRB0~PRB109, and the resources available to be allocated include 110 PRBs, which are 19.8 MHz, and there is a guard band of 0.2 MHz outside the PRB0. The indexes of the PRBs of the second subband are PRB110~PRB219, and the resources available to be allocated are 110 PRBs, which are 19.8 MHz, and there is a guard band of 0.2 MHz outside the PRB219. The last PRB (PRB109) of the first subband and the first PRB (PRB110) of the second subband are adjacent, as shown in FIG. 3.

Figure 3:
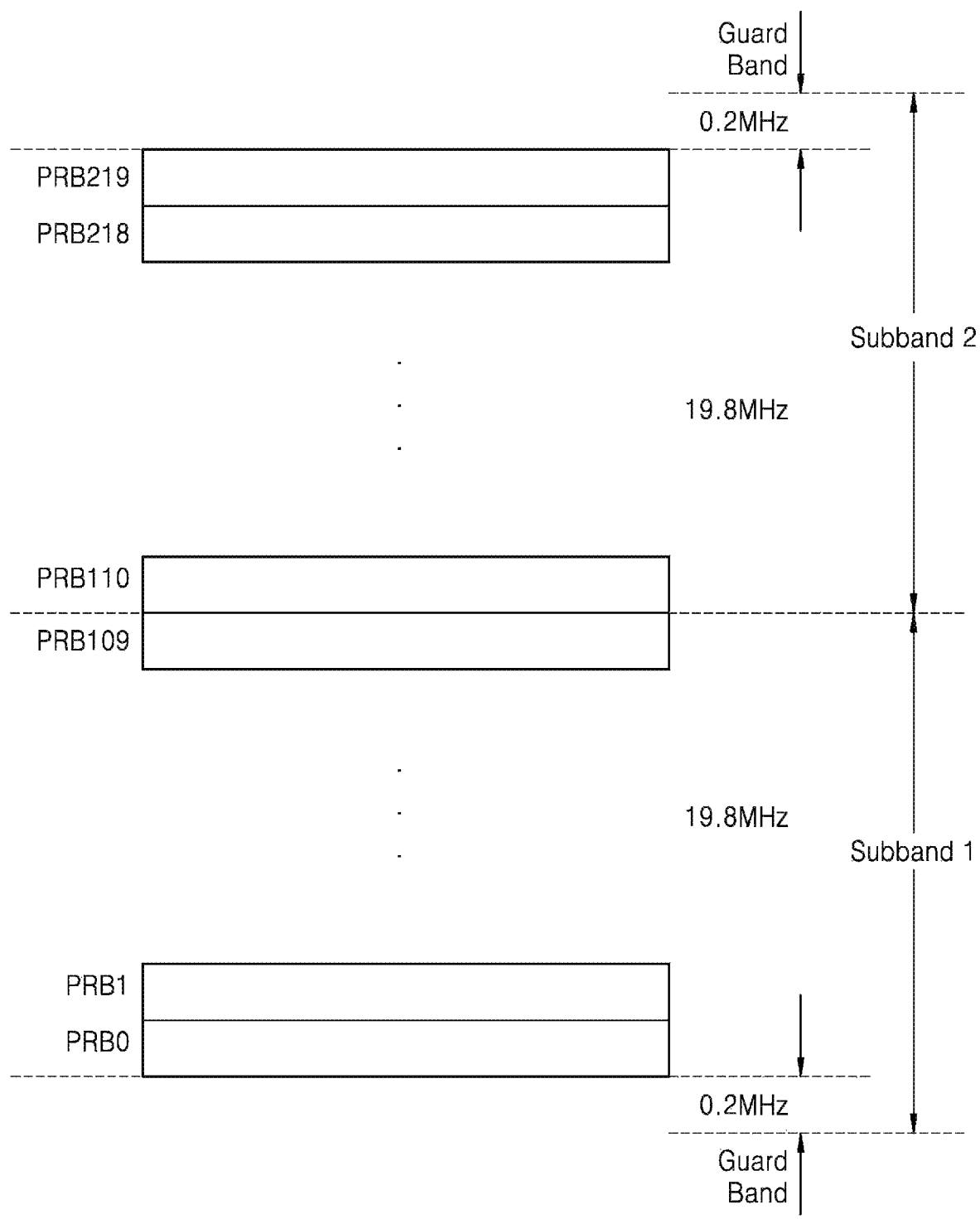
FIG. 3 schematically illustrates a diagram of a distribution of PRBs in Mode 6 according to an embodiment of the disclosure.

FIG. 3 schematically illustrates a diagram of a distribution of PRBs in Mode 6 according to an embodiment of the disclosure.

There are two modes to determine the RBG, as explained below.

Mode I:

The RBG is determined in units of subbands. None of PRBs of a RBG is located across two subbands respectively. Assuming that a carrier has a bandwidth of 40 MHz and a subcarrier spacing of 15 kHz, the carrier includes 2 subbands, and each subband has a bandwidth of 20 MHz. The carrier includes 220 PRBs, and each subband includes 110 PRBs. The indexes of the PRBs of the first subband are PRB0~PRB109, the resources available to be allocated include 110 PRBs, i.e., 19.8 MHz, and there is a guard band of 0.2 MHz outside the PRB0. The indexes of the PRBs of the second subband are PRB110~PRB219. Each RBG has a size of 8 PRBs. The first subband includes ceil (110/8)=14 RBGs, of which 13 RBGs each include 8 PRBs, and one RBG includes 6 PRBs. The second subband also includes ceil (110/8)=14 RBGs, of which 13 RBGs each include 8 PRBs, and one RBG includes 6 PRBs. This method is convenient for the resource allocation, and it may be determined whether an RBG may be used according to the carrier sensing result of one subband only.

Mode II:

The RBG is determined in units of carriers or bandwidths (BWs). It is possible that PRBs of a RBG are located across two subbands. Assuming that the bandwidth of one BWP is 40 MHz and the subcarrier spacing is 15 kHz. The BWP includes two subbands, each subband has a bandwidth of 20 MHz, and the BWP includes 220 PRBs, each subband includes 110 PRBs. The indexes of the PRBs of the first subband are PRB0~PRB109, the resources available to be allocated include 110 PRBs, i.e., 19.8 MHz, and there is a guard band of 0.2 MHz outside the PRB0. The indexes of the PRBs of the second subband are PRB110~PRB219. Each RBG has a size of 8 PRBs, and the two subbands include ceil (220/8)=28 RBGs, of which 27 RBGs include 8 PRBs, and one RBG includes 4 PRBs. The first subband includes 13 RBGs, each RBG including 8 PRBs. There is one RBG in the middle of the first subband and the second subband, including 8 PRBs, of which 6 PRBs are located in the first subband, and 2 PRBs are located in the second subband. The second subband has 14 RBGs, of which 13 RBGs each include 8 PRBs, and one RBG includes 4 PRBs.

In another embodiment of the disclosure, the bandwidth of the subband on which the carrier sensing is to be performed may be a predetermined (preset by the protocol) bandwidth. In this case, the bandwidth of the subband may not be an integer multiple of PRBs. For example, the bandwidth of the subband on which the carrier sensing is to be performed is 20 MHz, and when one carrier includes more than 2 subbands, for example, one carrier includes three subbands, some PRBs have a part located in one subband and another part in another subband, as shown in FIG. 4.

Figure 4:
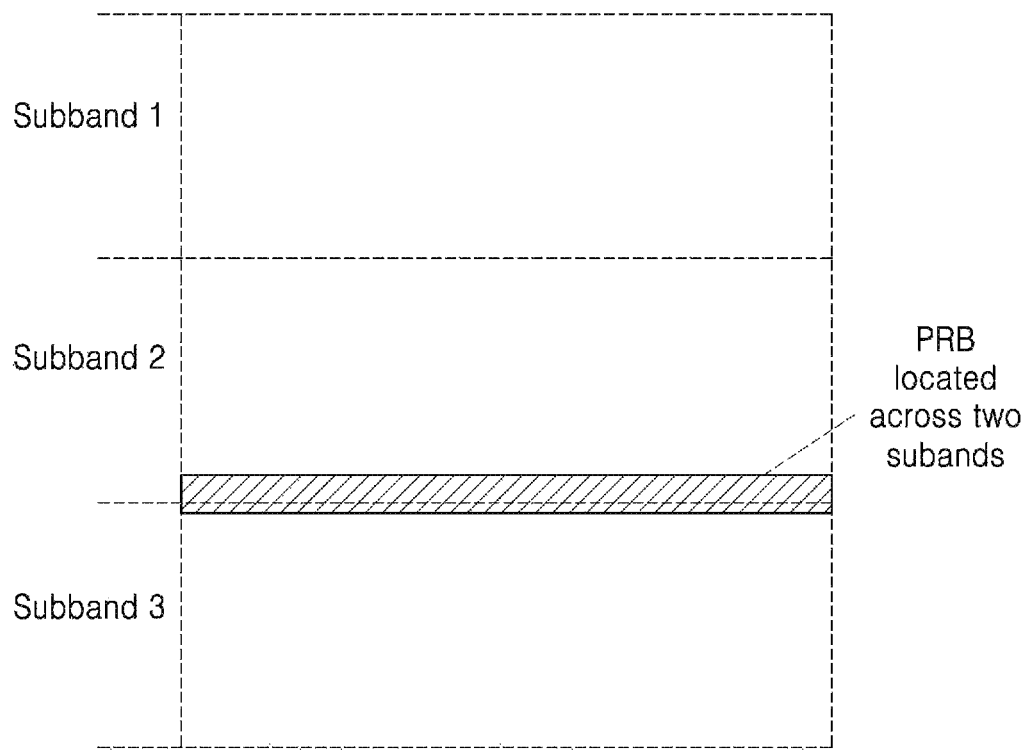
FIG. 4 schematically illustrates a diagram of a distribution of PRBs according to an embodiment of the disclosure.

FIG. 4 schematically illustrates a diagram of a distribution of PRBs according to an embodiment of the disclosure.

In operation 102, the base station performs carrier sensing on at least one of the subbands.

In operation 103, the base station allocates idle resources in one or more subbands to the UE.

In the case that the bandwidth of the subband on which the carrier sensing is to be performed is an integer multiple of PRBs, the PRB may be allocated according to the bandwidth of the subband and the carrier sensing result of the subband. The PRBs between the two adjacent subbands are continuous, and there is no guard band between two adjacent subbands. For example, the carrier has a bandwidth of 60 MHz and a subcarrier spacing of 15 KHz, and the carrier includes three subbands. Floor (60/0.18)=333 PRBs. The unit of the bandwidth of the subband on which the carrier sensing is to be performed, N, is 1, that is, in a unit of one PRB. Each subband contains 111 PRBs, the indexes of the PRBs of the first subband are PRB0~PRB110, the resources available to be allocated include 111 PRBs, which is 19.98 MHz. The indexes of the PRBs of the second subband are PRB111~PRB221, and the resources available to be allocated includes 111 PRBs. The indexes of the PRBs of the third subband are PRB222~PRB332, the resources available to be allocated include 111 PRBs, and there is a guard band of 0.06 MHz. There are guard bands of 0.03 MHz outside PRB0 and PRB332, respectively.

In the case that the bandwidth of the subband on which the carrier sensing is to be performed is not an integer multiple of PRBs, the PRB may be allocated according to one of the following modes.

Mode 1:

The PRB belonging to two subbands is not allocated. That is, the PRB across the two subbands on which the carrier sensing is to be performed respectively cannot be allocated, and only the PRBs in a single one subband may be allocated. For example, the bandwidth of the carrier is 60 MHz, the bandwidth of the subband on which the carrier sensing is to be performed is 20 MHz, and the carrier includes 3 subbands. Floor (60/0.18)=333 PRBs, and thus each subband contains 111 PRBs. The indexes of the PRBs of the first subband are PRB0~PRB110, the resources available to be allocated are 111 PRBs, which are 19.98 MHz, and there is a guard band of 0.02 MHz outside the PRB0. The indexes of the PRBs of the second subband are PRB111~PRB221, and the resources available to be allocated are 111 PRBs. PRB 222 belongs to two subbands, the second subband and the third subband. PRB 222 cannot be allocated. The indexes of the PRBs of the third subband are PRB223~PRB332, the resources available to be allocated include 110 PRBs, and there is a guard band of 0.04 MHz outside the PRB332, as shown in FIG. 5.

Figure 5:
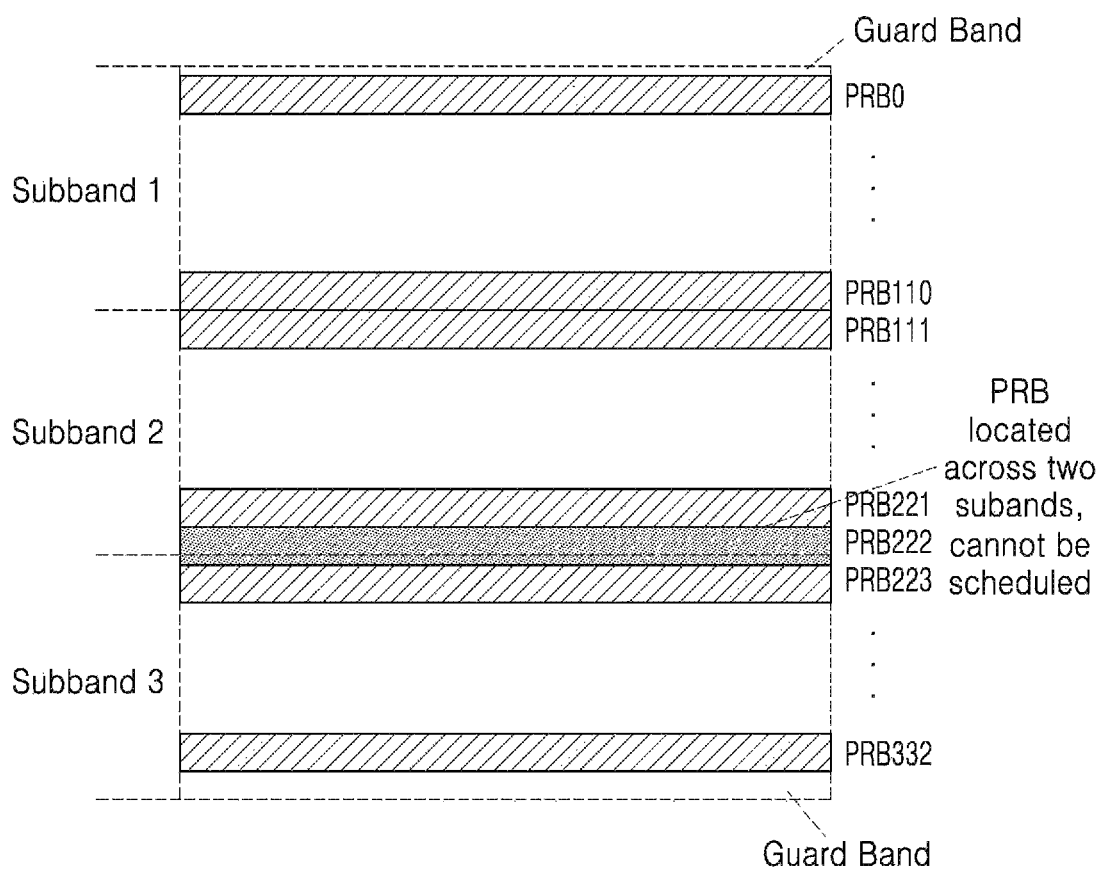
FIG. 5 schematically illustrates a diagram of a distribution of PRBs in Mode 1 according to an embodiment of the disclosure.

FIG. 5 schematically illustrates a diagram of a distribution of PRBs in Mode 1 according to an embodiment of the disclosure.

Mode 2:

It is determined whether a PRB belonging to two subbands may be allocated according to the carrier sensing results of the two subbands. That is, it is determined whether a PRB across the two subbands on which the carrier sensing is to be performed respectively may be allocated according to the carrier sensing results of the two subbands. It is determined whether a PRB located in a single one subband may be allocated according to the carrier sensing result of this subband. For example, the bandwidth of the carrier is 60 MHz, the bandwidth of the subband on which the carrier sensing is to be performed is 20 MHz, and the carrier includes three subbands. Floor (60/0.18)=333 PRBs, and thus each subband includes 111 PRBs. The indexes of the PRBs of the first subband are PRB0~PRB110, the resources available to be allocated are 111 PRBs, which are 19.98 MHz, and there is a guard band of 0.02 MHz outside the PRB0. The indexes of the PRBs of the second subband are PRB111~PRB221, the resource available to be allocated are 111 PRBs. PRB 222 belongs to two subbands, i.e., the second subband and the third subband. It is determined whether PRB 222 may be allocated according to the carrier sensing results of the second subband and the third subband. The indexes of the PRBs of the third subband are PRB223~PRB332, the resources available to be allocated are 110 PRBs, and there is a guard band of 0.04 MHz outside the PRB332, as shown in FIG. 6.

Figure 6:
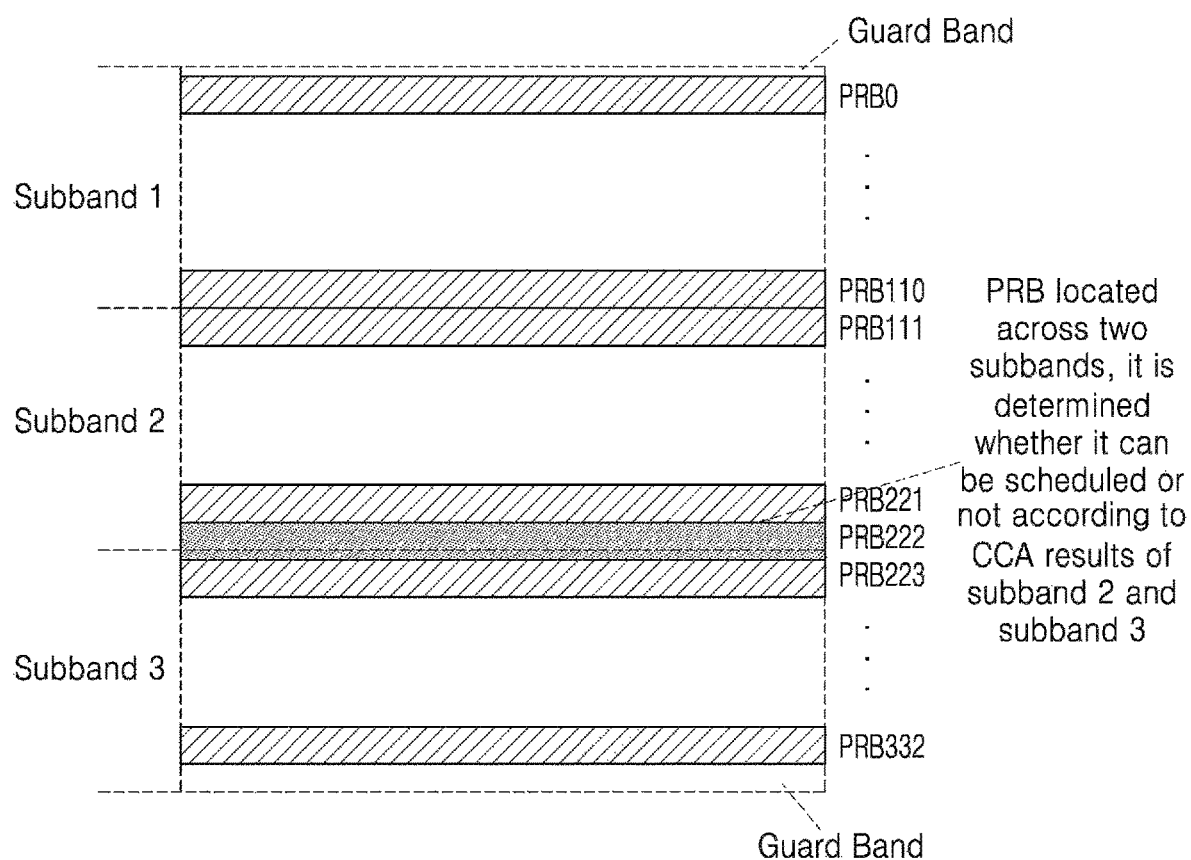
FIG. 6 schematically illustrates a diagram of a distribution of PRBs in Mode 2 according to an embodiment of the disclosure.

FIG. 6 schematically illustrates a diagram of a distribution of PRBs in Mode 2 according to an embodiment of the disclosure.

It should be understood that for a PRB across two subbands on which the carrier sensing is to be performed respectively, if the carrier sensing result of one subband is idle and the carrier sensing result of another subband is busy, the PRB cannot be allocated. The PRB may only be allocated if both of the carrier sensing result of the two subbands are idle.

A method of how to allocate a plurality of subbands within one carrier or one BWP according to an embodiment of the disclosure is described below. For simplification of the description, an allocation method in the case where a plurality of subbands are included in one BWP is taken as an example, but the method is also applicable to an allocation method in a case where a plurality of subbands are included in one carrier. The carrier sensing on the plurality of subbands is performed separately. In the same slot, there may be some subband whose carrier sensing results are idle, and some subbands whose carrier sensing results are busy. There are several resource allocation methods as following.

Method One:

The resources of each subband in one carrier or BWP are separately allocated. That is, each subband is configured with a Control Resource Set, and the control resource set in each subband allocates time-frequency resources in the subband for data transmission. For example, there are two subbands, and the base station configures a control resource set for each subband. The UE blindly detects the PDCCH in the control resource set of each subband, and the PDCCH in each control resource set may allocate PDSCH in the subband where the PDCCH is located, as shown in FIG. 7.

Figure 7:
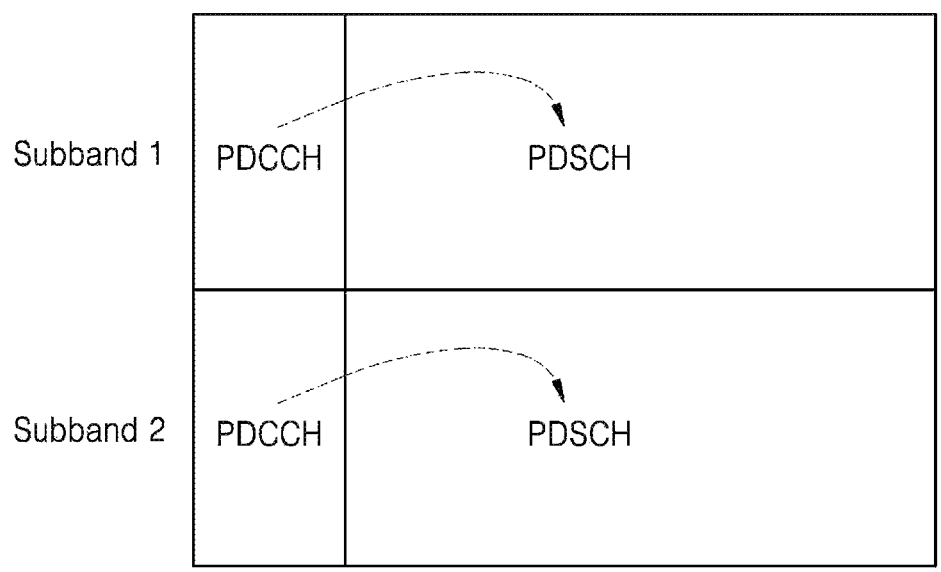
FIG. 7 schematically illustrates a diagram of resource allocation in Method 1 according to an embodiment of the disclosure.

FIG. 7 schematically illustrates a diagram of resource allocation in Method 1 according to an embodiment of the disclosure.

The advantage is that since the number of OFDM symbols available in each subband is the same, the allocation is relatively simple. However, when there are more subbands in one carrier, separate allocation of each subband would increase the resources occupied by the control channel.

Method Two:

The resources of multiple subbands in one carrier or BWP are jointly allocated. The control resource set in each subband may allocate time-frequency resources in the subband, or may allocate time-frequency resources in other subbands in the carrier or BWP where the subband is allocated. That is, a PDCCH in one subband may allocate a PDSCH in multiple subbands, resources in multiple subbands are used to transmit one PDSCH, or resources in each subband are used to transmit one PDSCH. For example, if there are two subbands, the PDCCH in the control resource set in one subband may allocate resources for the PDSCH in the two subbands.

Figure 8:
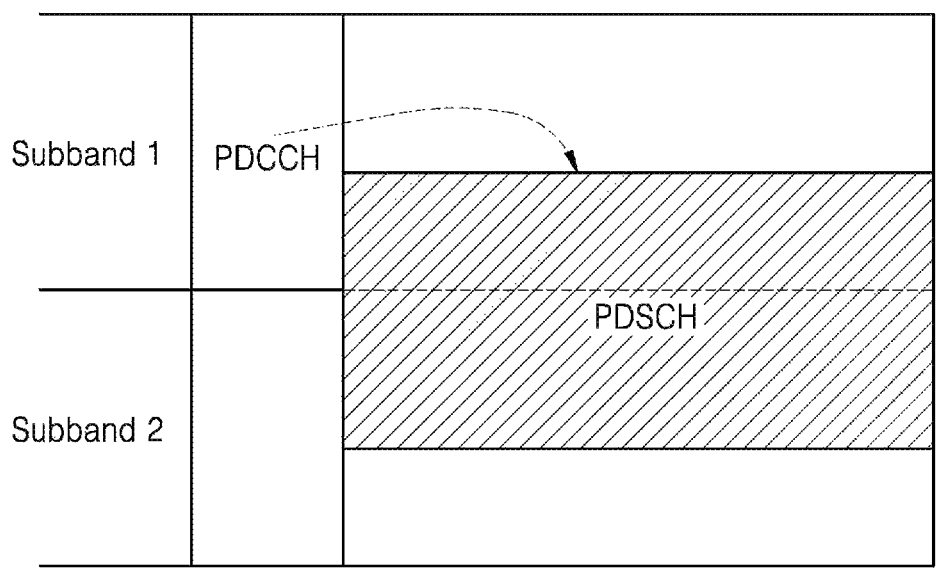
FIG. 8 schematically illustrates a diagram of resource allocation in Method 2 according to an embodiment of the disclosure.

FIG. 8 schematically illustrates a diagram of resource allocation in Method 2 according to an embodiment of the disclosure.

Referring to FIG. 8, the PDCCH of the subband 1 allocates time-frequency resources for PDSCH transmitted on the subband 1 and the subband 2. The advantage is that when there are more subbands within one carrier, the resources occupied by the control channel are saved because resources of multiple subbands may be allocated by one PDCCH.

Method Three:

The base station may indicate to the UE whether the resources of the multiple subbands in the carrier or the BWP are separately allocated or jointly allocated through a higher layer signaling configuration. For example, the higher layer signaling configuration transmitted by the base station indicates that the subband 1 and the subband 2 in the BWP are jointly allocated (herein, the joint allocation means that one PDCCH of one subband may allocate resources of a subband where the PDCCH is not located for data transmission, and may allocate the resources of multiple subbands for data transmission). Alternatively, the higher layer signaling configuration transmitted by the base station indicates that subband 1 and subband 2 in the BWP are separately allocated (that is, one PDCCH may only allocate the time-frequency resources of the subband where the PDCCH is located for data transmission).

Method Four:

The base station may indicate whether the resources of each subband are separately allocated or jointly allocated through different search spaces. For example, the common search space is separately allocated; the UE-specific search space is jointly allocated. Alternatively, for the UE-specific search space, the base station may indicate whether the resources of each subband are separately allocated or jointly allocated by using different DCI formats. That is, the DCI format for allocating the PDSCH indicates whether it is separately allocated or jointly allocated. The number of bits in some DCI format is determined according to the separate allocation. The UE blindly detects the DCI according to the number of bits determined according to the separate allocation mode when the UE blindly detects PDCCH. The number of bits in some DCI format is determined according to the joint allocation. The UE blindly detects the DCI according to the number of bits determined according to the joint allocation mode when the UE blindly detects PDCCH. The number of bits of the DCI format indicating separate allocation and joint allocation are different. For example, the DCI of the fallback format (for example, DCI format 1-0) is of separate allocation, that is, DCI format 1-0 may only allocate the resource in the subband where DCI format 1-0 is located to transmit PDSCH, as shown in FIG. 9.

Figure 9:
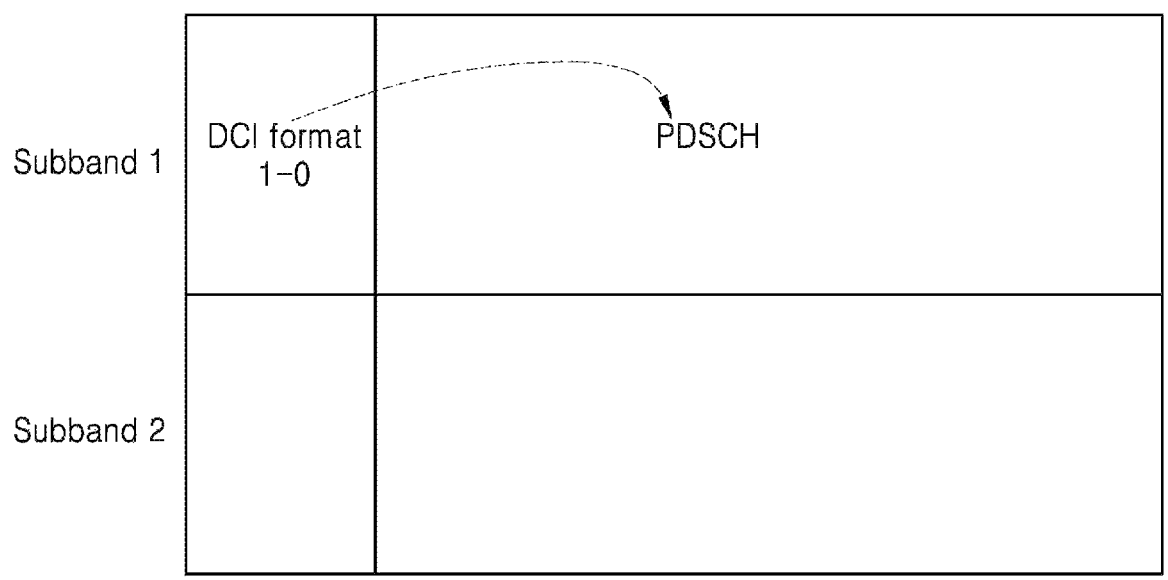
FIG. 9 schematically illustrates a diagram of a resource allocation in Method 4 according to an embodiment of the disclosure.

FIG. 9 schematically illustrates a diagram of a resource allocation in Method 4 according to an embodiment of the disclosure.

Figure 10:
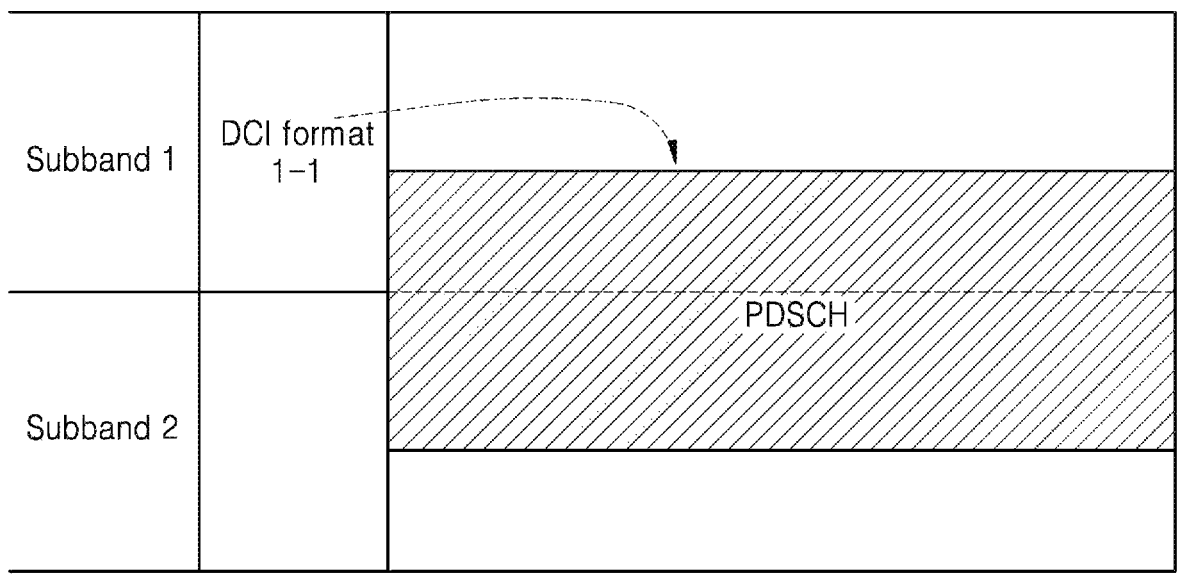
FIG. 10 schematically illustrates a diagram of another resource allocation in Method 4 according to an embodiment of the disclosure.

The DCI of the non-fallback format (for example, DCI format 1-1) is of joint allocation, that is, the DCI format 1-1 in one subband may allocate resources in multiple subbands to transmit PDSCH, as shown in FIG. 10.

FIG. 10 schematically illustrates a diagram of another resource allocation in Method 4 according to an embodiment of the disclosure.

The advantage is that the allocation is flexible. If you want to save the number of PDCCH bits and the amount of allocated data is smaller, you may use the fallback DCI format. For allocation that uses a non-backoff DCI format, there are a large amount of data to transmit and also it needs to allocate many resources, and more resources of subbands may be allocated through one PDCCH.

For the joint allocation, there are several methods.

Method 1:

The relative positions of resources allocated in individual subbands on which the carrier sensing is to be performed in a carrier or a BWP are the same. That is, one DCI allocates resources in multiple subbands, and the resources allocated in each subband are the same. That is, the number of frequency domain PRBs of the resources allocated in each subband and the relative position in each subband are the same.

Figure 11:
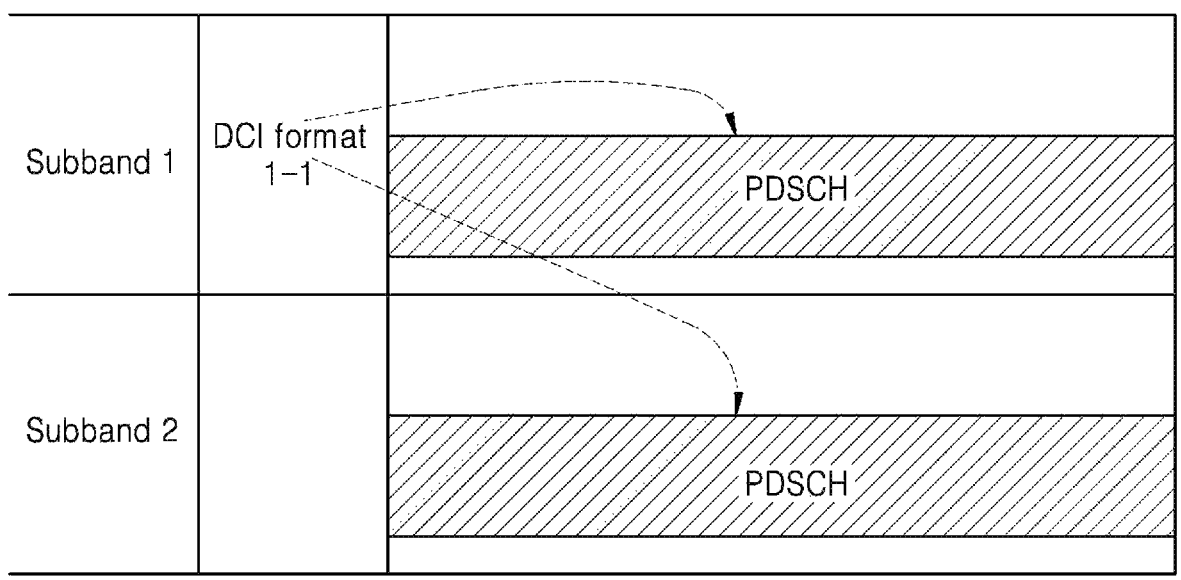
FIG. 11 schematically illustrates a diagram of Method 1 of jointly allocating resources according to an embodiment of the disclosure.

FIG. 11 schematically illustrates a diagram of Method 1 of jointly allocating resources according to an embodiment of the disclosure.

Referring to FIG. 11, subband indication information is added to the DCI to indicate which subbands are allocated. For example, in the method of bit mapping, the BWP includes two subbands, and 2-bit subband indication information indicates the allocation of two subbands respectively. That is, each bit indicates the allocation of one subband. When the bit value is "1", the corresponding resource of the subband is allocated. When the bit value is "0", the corresponding resource of the subband is not allocated.

Method 2:

The resources of individual subbands in a carrier or a BWP are allocated as a whole band. The PDCCH in each subband may allocate resources in all subbands in the BWP, and the resources allocated in each subband may be different. The frequency domain resources allocated in the each subband may be different, and the time domain resources allocated in each subband may be different. The resource allocation field in the DCI includes a time domain resource allocation field and a frequency domain resource allocation field.

The frequency domain resource indicated by the frequency domain resource allocation field may be a frequency domain resource in more than one subband. The PRBs of multiple subbands are indexed as a whole, and one RBG may be located across two adjacent subbands. For example, a carrier has a bandwidth of 40 MHz and a subcarrier spacing of 15 kHz, and the carrier includes 222 PRBs. The RBG has a size of 8 PRBs. There are 28 RBGs in total, of which 27 RBGs each include 8 PRBs and one RBG includes 6 PRBs. The bandwidth of the first subband includes 13 RBGs, each RBG including 8 PRBs, then the bandwidth of the first subband includes 13*8=104 PRBs in total, and the RBGs are indexed 0-12. The bandwidth of the second subband includes 13 RBGs each having 8 PRBs, then 13*8=104 PRBs in total, and the RBGs are indexed 14~26. The RBG indexed 13 is located across two adjacent subbands, and its allocation is determined based on the carrier sensing results of the first subband and the second subband. That is, the RBG may only be allocated if the carrier sensing results of the first subband and the second subband are all idle. The RBG indexed 13 include 8 PRBs, of which 7 PRBs belong to the first subband and one PRB belongs to the second subband. The bandwidth of the second subband includes one RBG having 6 PRBs, which RBG is indexed 27, as shown in FIG. 12.

Figure 12:
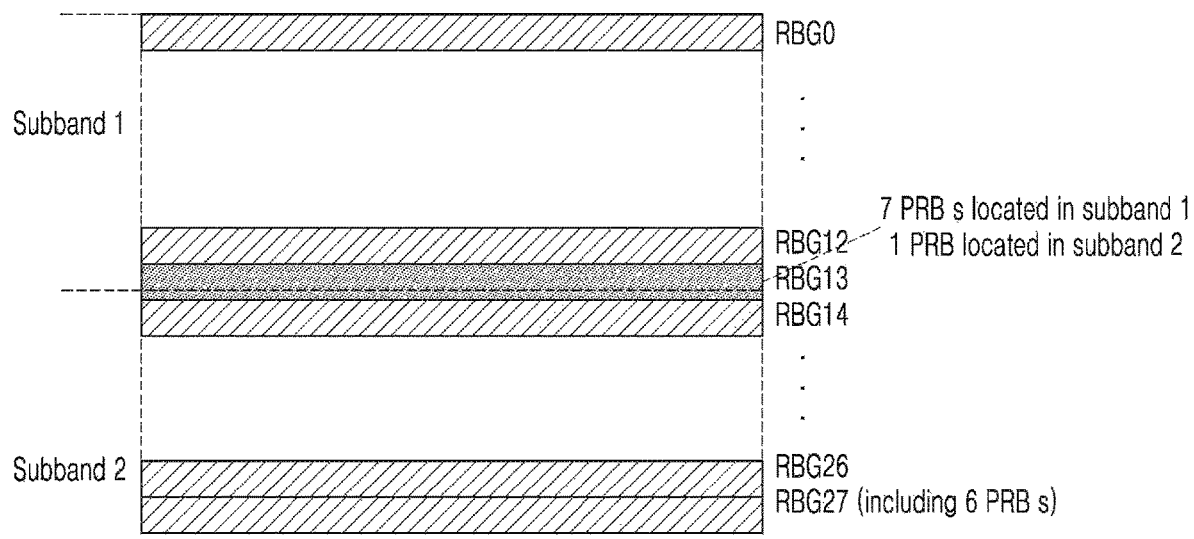
FIG. 12 schematically illustrates a diagram of Method 2 of jointly allocating resources according to an embodiment of the disclosure.

FIG. 12 schematically illustrates a diagram of Method 2 of jointly allocating resources in accordance with an embodiment of the disclosure.

The frequency domain resource allocation field may include 28 bits, each bit indicating the resources in each RBG are allocated or not. When the bit value is "1", the resources of the PRB in the RBG are allocated. When the bit value is "0", the resources of the PRB with the RBG are not allocated.

Figure 13:
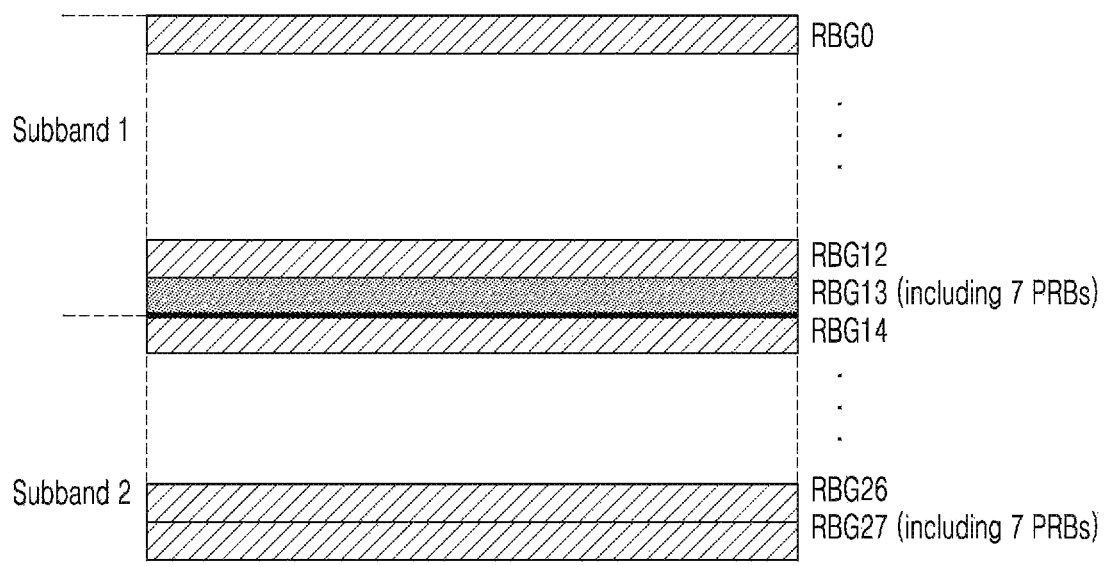
FIG. 13 schematically illustrates a diagram of another embodiment of Method 2 of jointly allocating resources according to an embodiment of the disclosure.

The frequency domain resource indicated by the frequency domain resource allocation field may be a frequency domain resource in more than one subband. The PRBs of each subband are independently indexed, and one RBG is not located across two adjacent subbands. For example, a carrier has a bandwidth of 40 MHz and a subcarrier spacing of 15 kHz, and the carrier includes 222 PRBs. The RBG has a size of 8 PRBs. There are 28 RBGs in total, of which 26 RBGs each include 8 PRBs and 2 RBG each include 7 PRBs. The bandwidth of the first subband includes 14 RBGs of which 13 RBGs each include 8 PRBs (13*8=104 PRBs), the RBGs being indexed 0~12, and one RBG includes 7 PRBs, the RBG being indexed 13. The bandwidth of the first subband includes 111 PRBs. The bandwidth of the second subband includes 14 RBGs, of which 13 RBGs each include 8 PRBs (13*8=104 PRBs), the RBGs being indexed 13~26, one RBG includes 7 PRBs, the RBG being indexed 27. The bandwidth of the second subband includes 111 PRBs, as shown in FIG. 13. The frequency domain resource allocation field may include 28 bits, each bit indicating the resources in each RBG are allocated or not. When the bit value is "1", the resources of the PRB in the RBG are allocated. When the bit value is "0", the resources of the PRB in the RBG are not allocated.

FIG. 13 schematically illustrates a diagram of another embodiment of Method 2 of jointly allocating resources according to an embodiment of the disclosure.

The time domain resource allocation field may share one field. That is, the resources allocated by the resources in all the subbands have the same number of OFDM symbols in the time domain, and only one time domain allocation field is needed, which may save the bits in DCI used for the time domain resource allocation field.

Alternatively, the time domain resources in each subband are separately allocated. Since the carrier sensing is performed separately on each subband, and the idle time of each subband may also be different, it will make resource utilization more efficient and may need a bit more number of bits for indication. For example, the bandwidth of one carrier includes two subbands, and the DCI includes two time domain resource allocation fields, which are a first time domain resource allocation field and a second time domain resource allocation field, and each time domain resource allocation field indicates the time domain resources in each subband. For example, the first time domain resource allocation field is used to allocation of OFDM symbols 1 to 10, and the second time domain resource allocation field is used to allocation of OFDM symbols 0 to 12.

In operation 104, the base station transmits, to the UE, control information indicating the resources allocated to the UE.

The current coded and modulated data symbols are mapped to the allocated physical resources in the order of frequency domain first and time domain next. That is, the coded and modulated data symbols are mapped on the allocated physical resources according to the order of the PRBs first and then the order of the OFDM symbols. For example, the allocated physical resource includes N PRBs and M OFDM symbols, each PRB includes 12 subcarriers, and each OFDM symbol includes N*12 subcarriers, wherein the subcarriers are indexed $\{0, 1, \ldots, n, \ldots, N*12-1\}$, the OFDM symbols are indexed $\{0, 1, \ldots, M-1\}$, and each physical resource is denoted as $r_{n,m}$, where n represents the sequence number of the subcarrier, m represents the sequence number of the OFDM symbol, and the data symbols are denoted as $\{a_0, a_1, \ldots, a_{N*12*M-1}\}$. The mapping of the data symbols starts from the lowest subcarrier of OFDM symbol 0 to all subcarriers of OFDM symbol 0, then mapped to all subcarriers of OFDM symbol 1, and so on, until the highest subcarrier of OFDM symbol M−1. That is, data a0 are mapped to physical resource r0,0, and data a1 are mapped to physical resource r1, 0, . . . , data a(N*12*M−1) are mapped to the physical resource r(N*12−1), (M−1). A data symbol is a transport block and may contain several coded blocks. The data symbols are mapped to physical resources in the order of the frequency domain first and the time domain next. Each coded block occupies a wide frequency band, as shown in FIG. 14.

Figure 14:
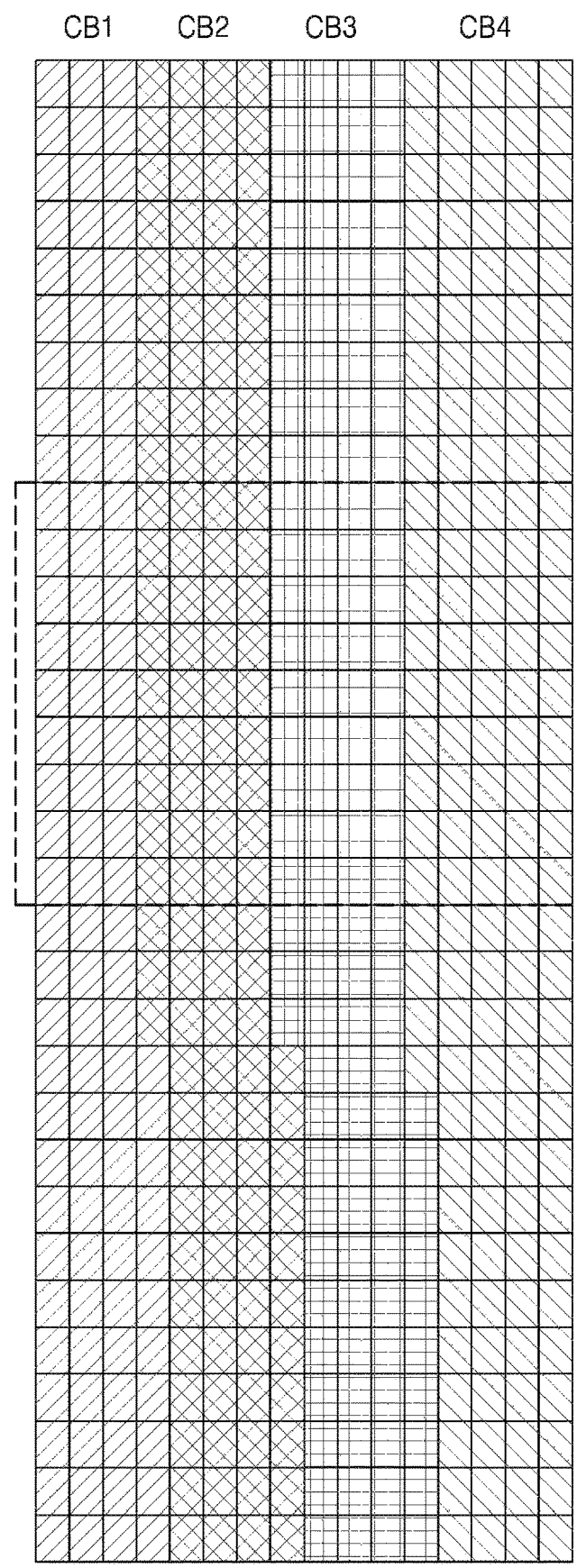
FIG. 14 schematically illustrates a diagram of mapping of code-modulated data symbols to allocated physical resources in the order of the frequency domain first and the time domain next in the prior art according to an embodiment of the disclosure.

FIG. 14 schematically illustrates a diagram of mapping of code-modulated data symbols to allocated physical resources in the order of the frequency domain first and the time domain next in the prior art according to an embodiment of the disclosure.

For the unlicensed band, since the bandwidths on which the carrier sensing is performed may be different, the carrier sensing result of the entire bandwidth is idle, but some bands of some frequency domain resources are seriously interfered, and other frequency bands are not interfered seriously, which may result in decoding errors of all coded blocks.

In order to prevent the occurrence of such a situation, the embodiment of the disclosure proposes that the coded and modulated data symbols may be mapped to the allocated physical resources in the order of the time domain first and the frequency domain next. For example, the allocated physical resources include N PRBs and M OFDM symbols, each PRB includes 12 subcarriers, each OFDM symbol includes N*12 subcarriers, and the subcarriers are indexed {0, 1, . . . , n, . . . , N*12−1}, the OFDM symbols are indexed {0, 1, . . . , M−1}, and each physical resource is denoted as rn,m, where n represents the sequence number of the subcarrier, m represents the sequence number of the OFDM symbol, and the data symbols are denoted as {a0, a1, . . . , aN*12*M−1}. The mapping of the data symbols starts from the lowest OFDM symbol of subcarrier 0 to all OFDM symbols of subcarrier 0, and then to all OFDM symbol subcarriers of subcarrier 1, and so on, until all OFDM symbols of subcarrier N*12−1. That is, data a0 are mapped to physical resource r0,0, data a1 are mapped to physical resource r0, 1, . . . , data a(N*12*M−1) are mapped to physical resource r(N*12−1), (M−1).

Thus, if some of the frequency bands are severely interfered, some coded blocks (CBs) in CB groups CB1, CB2, CB3, and CB3 are erroneous, and some CBs are correct, the retransmission of a part of data may be reduced by combining with the method of feeding back HARQ-ACK in units of coded block groups (CBG). The UE determines whether the coded and modulated data symbols are mapped to the allocated physical resources in the order of the time domain first and the frequency domain next or in the order of the frequency domain first and the time domain next by receiving signaling information (including higher layer signaling, physical layer signaling, media access layer signaling) or according to the property of the serving cell, or determines whether the coded and modulated data symbols are mapped to the allocated physical resources in the order of the time domain first and the frequency domain next or in the order of the frequency domain first and the time domain next based on whether the serving cell is configured with the method of feeding back HARQ-ACK in units of CBGs, or determines whether the coded and modulated data symbols are mapped to the allocated physical resources in the order of the time domain first and the frequency domain next or in the order of the frequency domain first and the time domain next based on the bandwidth of the subband on which the carrier sensing is to be performed in the serving cell. For example, the UE determines that the coded and modulated data symbols are mapped to the allocated physical resources in the order of the time domain first and the frequency domain next in a serving cell (or a BWP) by receiving the higher layer signaling configuration. Alternatively, the UE determines that the coded and modulated data symbols are mapped to the allocated physical resources in the order of the frequency domain first and the time domain next in a serving cell by receiving the higher layer signaling configuration. Alternatively, for a serving cell in the unlicensed band, the coded and modulated data symbols are mapped to the allocated physical resources in the order of the time domain first and the frequency domain next. For a serving cell in the licensed band, the coded and modulated data symbols are mapped to the allocated physical resources in the order of the frequency domain first and the time domain next. Alternatively, for a serving cell in the unlicensed band, the coded and modulated data symbols are mapped to the allocated physical resources in the order of the time domain first and the frequency domain next if the serving cell is configured with the method of feeding back HARQ-ACK in units of CBGs, and the coded and modulated data symbols are mapped to the allocated physical resources in the order of the frequency domain first and the time domain next if the serving cell is not configured with the method of feeding back HARQ-ACK in units of CBGs. Alternatively, for a serving cell in the unlicensed band, the coded and modulated data symbols are mapped to the allocated physical resources in the order of the time domain first and the frequency domain next if the bandwidth of the subband on which the carrier sensing is to be performed in the serving cell is greater than 20 MHz, and the coded and modulated data symbols are mapped to the allocated physical resources in the order of the frequency domain first and the time domain next if the bandwidth of the subband on which the carrier sensing is to be performed in the serving cell is less than or equal to 20 MHz.

A flowchart of a method of transmitting downlink data performed on the UE side according to an embodiment of the disclosure will be specifically described below with reference to FIG. 15.

Figure 15:
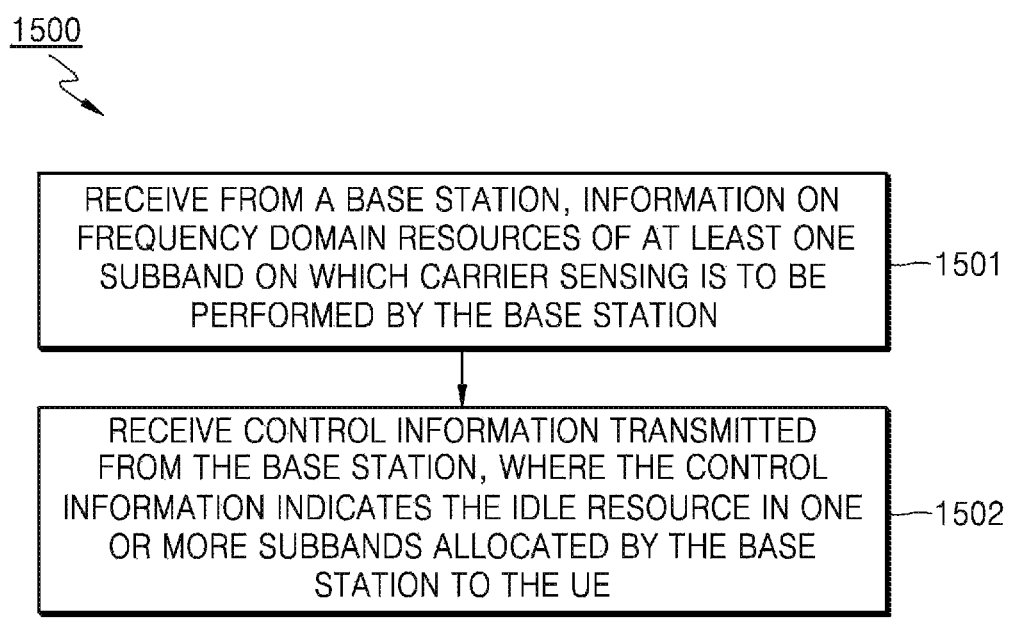
FIG. 15 schematically illustrates a flowchart of a method of transmitting downlink data performed on a user equipment (UE) side according to an embodiment of the disclosure.

FIG. 15 schematically illustrates a flowchart of a method 1500 for transmitting downlink data performed on the UE side, according to an embodiment of the disclosure.

Referring to FIG. 15, method 1500 may include operations 1501 and 1502.

In operation 1501, the UE receives from a base station, information on frequency domain resources of at least one subband on which the carrier sensing is to be performed by the base station.

In an embodiment of the disclosure, the information may include a bandwidth and a location of a frequency domain resource of at least one subband on which the carrier sensing is to be performed that is determined by the base station in accordance with one of Modes 1-6 (described in detail in operation 101 of the method 100, which will not be described herein for simplicity).

In an embodiment of the disclosure, the UE may determine the bandwidth and location of the frequency domain resource of the at least one subband on which the carrier sensing is to be performed by signaling received from the base station, the signaling including: a higher layer signaling configuration (UE-specific higher layer signaling configuration or cell common higher layer signaling configuration), system information, or protocol presetting, or physical layer signaling. Alternatively, the UE may determine the bandwidth and location of the frequency domain resource of the at least one subband on which the carrier sensing is to be performed according to the bandwidth configured by the higher layer signaling or the bandwidth configured according to the system information.

In an embodiment of the disclosure, the bandwidth of the subband on which the carrier sensing is to be performed is in a basic unit of N PRBs, where N is a positive integer.

In an embodiment of the disclosure, the bandwidth of the subband on which the carrier sensing is to be performed is determined according to one of approaches, in which:

the number N of PRBs included in the basic unit of the bandwidth of the subband on which the carrier sensing is to be performed is preset by the protocol, and a subcarrier spacing of the PRB is determined according to a reference subcarrier spacing;

the number N of PRBs included in the basic unit of the bandwidth of the subband on which the carrier sensing is to be performed is preset by the protocol, and a subcarrier spacing of the PRB is a subcarrier spacing of a carrier or a Bandwidth Part (BWP) which is a part of the carrier where the subband on which the carrier sensing is to be performed is located;

the number N of PRBs included in the basic unit of the bandwidth of the subband on which the carrier sensing is to be performed is configured by a higher layer signaling, and a subcarrier spacing of the PRB is determined according to a reference subcarrier spacing;

the number N of PRBs included in the basic unit of the bandwidth of the subband on which the carrier sensing is to be performed is configured by a higher layer signaling, and a subcarrier spacing of the PRB is a subcarrier spacing of a carrier or a BWP where the subband on which the carrier sensing is to be performed is located;

the number N of PRBs included in the basic unit of the bandwidth of the subband on which the carrier sensing is to be performed is determined by a predetermined correspondence between the number of PRBs configured by the higher layer signaling and the bandwidth of the subband on which the carrier sensing is to be performed, and a subcarrier spacing of the PRB is a subcarrier spacing of a carrier or a BWP where the subband on which the carrier sensing is to be performed is located;

the number N of PRBs included in the basic unit of the bandwidth of the subband on which the carrier sensing is to be performed is the same as the number of PRBs in a RBG used for resource allocation in the subband, wherein the RBG is a basic unit of frequency domain resource allocation.

In an embodiment of the disclosure, the RBG is determined according to one of approaches, in which:

the RBG is in a basic unit of a subband on which the carrier sensing is to be performed, wherein PRBs in the RBG are in a single one subband on which the carrier sensing is to be performed;

the RBG is in a basic unit of a carrier or a BWP, wherein PRBs in the RBG may be in different subbands on which the carrier sensing is to be performed.

In another embodiment, the bandwidth of the subband on which the carrier sensing is to be performed may be a predetermined (preset by the protocol) bandwidth. In this case, the bandwidth of the subband may not be an integer multiple of PRBs. For example, the bandwidth of the subband on which the carrier sensing is to be performed is 20 MHz. When one carrier includes more than 2 subbands, for example, one carrier includes three subbands, some PRBs have a part located in one subband and another part in another subband, as shown in FIG. 4.

In operation 1502, the UE receives control information transmitted from the base station, where the control information indicates the idle resources in one or more subbands allocated by the base station to the UE.

In the case that the bandwidth of the subband on which the carrier sensing is to be performed is an integer multiple of PRBs, the PRB may be allocated by the base station according to the bandwidth of the subband and the carrier sensing result of the subband.

In another embodiment of the disclosure, the bandwidth of the subband on which the carrier sensing is to be performed may be a predetermined (preset by the protocol) bandwidth. In this case, the bandwidth of the subband may not be an integer multiple of PRBs. In the case where the bandwidth of the subband on which the carrier sensing is to be performed is not an integer multiple of PRBs, the PRB is allocated according to one of the following ways:

a PRB located across two subbands on which the carrier sensing is to be performed respectively is not allocated, and it is determined whether a PRB located in a single one subband may be allocated according to the carrier sensing result of this subband;

it is determined whether a PRB located across two subbands on which the carrier sensing is to be performed respectively may be allocated according to the carrier sensing result of the two subbands, and it is determined whether a PRB located in a single one subband may be allocated according to the carrier sensing result of this subband.

In an embodiment of the disclosure, the idle resources in the one or more subbands allocated by the base station to the UE are obtained by one of approaches, in which:

resources of individual subbands on which the carrier sensing is to be performed in a carrier or a BWP which is a part of the carrier are separately allocated by the base station;

resources of individual subbands on which the carrier sensing is to be performed in a carrier or a BWP are jointly allocated by the base station;

it is determined whether to separately or jointly allocate resources of individual subbands on which the carrier sensing is to be performed in a carrier or a BWP by receiving a higher layer signaling configuration from the base station;

it is determined whether to separately or jointly allocate resources of individual subbands on which the carrier sensing is to be performed in a carrier or a BWP by receiving different DCI formats from the base station.

In an embodiment, for joint allocation, the relative positions of resources allocated in individual subbands on which the carrier sensing is to be performed in a carrier or a BWP are the same; or the resources of the individual subbands on which the carrier sensing is to be performed in a carrier or a BWP are allocated as a whole band.

In an embodiment of the disclosure, the UE may receive data from the allocated resources in the order of the time domain first and the frequency domain next.

Although the method described in detail in the above embodiments of the disclosure is applied to downlink data transmission (that is, the base station transmits data, the UE receives data, and the base station performs carrier sensing), those skilled in the art should understand that the basic idea of the disclosure may also be applied to uplink data transmission, that is, the UE transmits data, the base station receives data, and the UE performs carrier sensing.

In the unlicensed band, the UE performs carrier sensing before transmitting the HARQ-ACK on the PUCCH or the PUSCH. If the carrier sensing result is idle, the UE transmits the HARQ-ACK. If the carrier sensing result is busy, the UE is not allowed to transmit the HARQ-ACK, and if the fixed timing relationship is followed, the HARQ-ACK will not be transmitted. In order to increase the transmission opportunity of HARQ-ACK, the disclosure proposes configuring a plurality of HARQ-ACK transmission time units (for example, time slots) for a UE, which is referred to as a set of HARQ-ACK transmission time units.

A flowchart of a method of transmitting a HARQ-ACK performed on the base station side according to an embodiment of the disclosure will be specifically described below with reference to FIG. 16.

Figure 16:
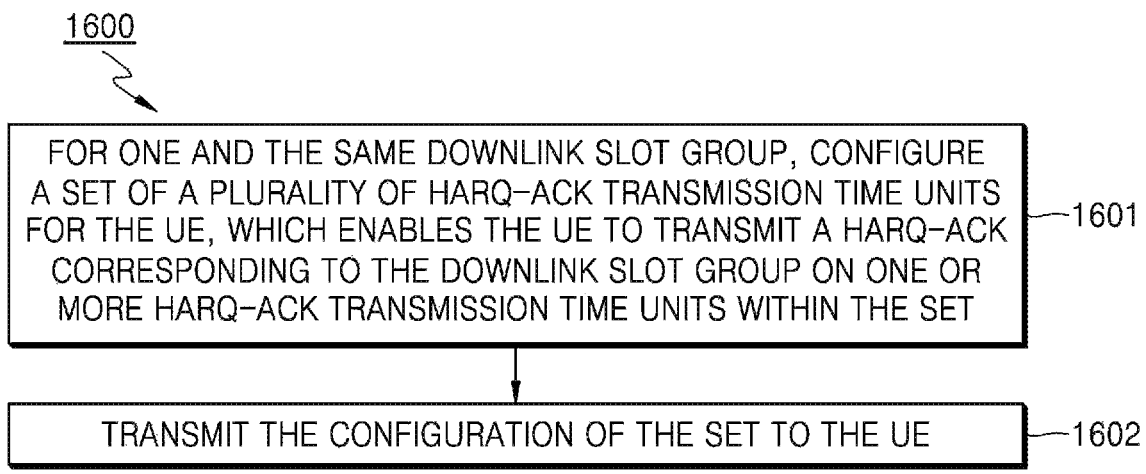
FIG. 16 schematically illustrates a flowchart of a method of transmitting a hybrid automatic repeat request acknowledgement (HARQ-ACK) performed on a base station side according to an embodiment of the disclosure.

FIG. 16 schematically illustrates a flowchart of a method 1600 for transmitting a HARQ-ACK performed on a base station side according to an embodiment of the disclosure.

Referring to FIG. 16, method 1600 may include operations 1601 and 1602.

In operation 1601, the base station may configure a set of a plurality of HARQ-ACK transmission time units (e.g. time slots) for the UE. For example, the set of HARQ-ACK transmission time units includes a total of three slots, the uplink slots {n, n+k, n+m}.

For the sake of simplicity, the HARQ-ACK transmitted in any slot of the same set of the HARQ-ACK transmission time units is corresponding to the same downlink slot group. That is, for one and the same downlink slot group, the base station may configure a set of a plurality of HARQ-ACK transmission time units for the UE, which enables the UE to transmit a HARQ-ACK corresponding to the downlink slot group on one or more HARQ-ACK transmission time units within the set.

For example, the set of the HARQ-ACK transmission time units is the uplink slots {n, n+k, n+m}, and the association set of the HARQ-ACK transmitted in the slot n is the downlink slots {n−p, n−q}. That is, the HARQ-ACK of the PDSCH of the downlink slots (n−p) and (n−q) may be transmitted in the uplink slot n, and the HARQ-ACK of the PDSCH of the downlink slots (n−p) and (n−q) may also be transmitted in the uplink slot (n+k), the HARQ-ACK of the PDSCH of the downlink slots (n−p) and (n−q) may also be transmitted in the uplink slot (n+m), and the UE may obtain the set of uplink slot {n, n+k, n+m} by using the high layer signaling configuration or the combination of the signaling information or the physical layer signaling indication and the high layer signaling configuration, as shown in FIG. 17.

Figure 17:
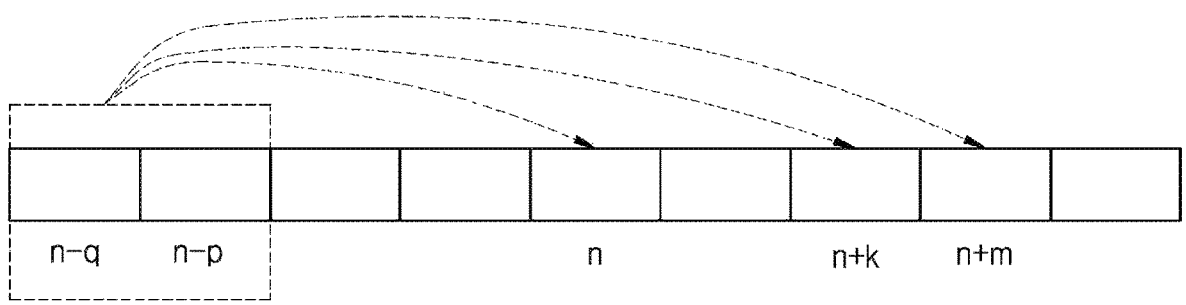
FIG. 17 schematically illustrates a timing diagram of a downlink slot group and a corresponding set of HARQ-ACK transmission time units according to an embodiment of the disclosure.

FIG. 17 schematically illustrates a timing diagram of a downlink slot group and a corresponding set of HARQ-ACK transmission time units according to an embodiment of the disclosure.

The above n, k, m, p, q are non-negative integers.

In operation 1602, the base station transmits the configuration of the set to the UE.

A flowchart of a method of transmitting a HARQ-ACK performed on the UE side according to an embodiment of the disclosure will be specifically described below with reference to FIG. 18.

Figure 18:
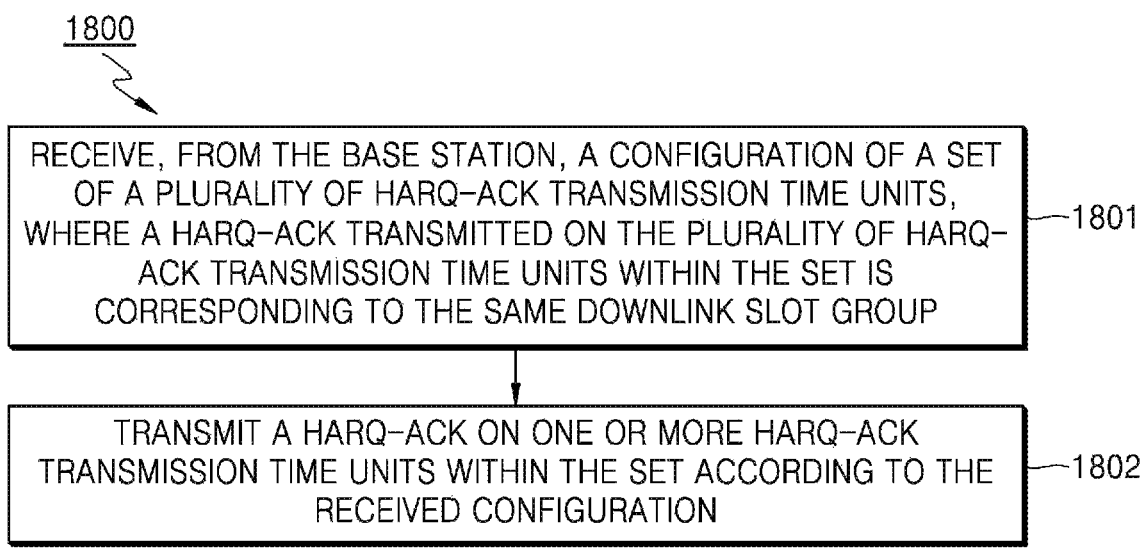
FIG. 18 schematically illustrates a flowchart of a method of transmitting a HARQ-ACK performed on a UE side according to an embodiment of the disclosure.

FIG. 18 schematically illustrates a flowchart of a method 1800 for transmitting a HARQ-ACK performed on the UE side according to an embodiment of the disclosure.

Referring to FIG. 18, method 1800 may include operations 1801 and 1802.

In operation 1801, the UE receives, from the base station, a configuration of a set of a plurality of HARQ-ACK transmission time units, where a HARQ-ACK transmitted on the plurality of HARQ-ACK transmission time units in the set is corresponding to the same downlink slot group.

In operation 1802, the UE transmits a HARQ-ACK on one or more HARQ-ACK transmission time units within the set according to the received configuration. Furthermore, before transmitting the HARQ-ACK, the UE sequentially performs carrier sensing in the HARQ-ACK transmission time units within the set.

In an implementation of operation 1802, if the carrier sensing result of a first HARQ-ACK transmission time unit in the set is idle, the HARQ-ACK is transmitted on the first HARQ-ACK transmission time unit without performing carrier sensing in the subsequent HARQ-ACK transmission time units; if the carrier sensing result of the first HARQ-ACK transmission time unit is busy, carrier sensing is performed in a next HARQ-ACK transmission time unit until a HARQ-ACK transmission time unit whose carrier sensing result is idle is found to transmit the HARQ-ACK without performing carrier sensing in the subsequent HARQ-ACK transmission time units; if the carrier sensing result is busy up to the last HARQ-ACK transmission time unit in the set, no HARQ-ACK is transmitted.

Figure 19:
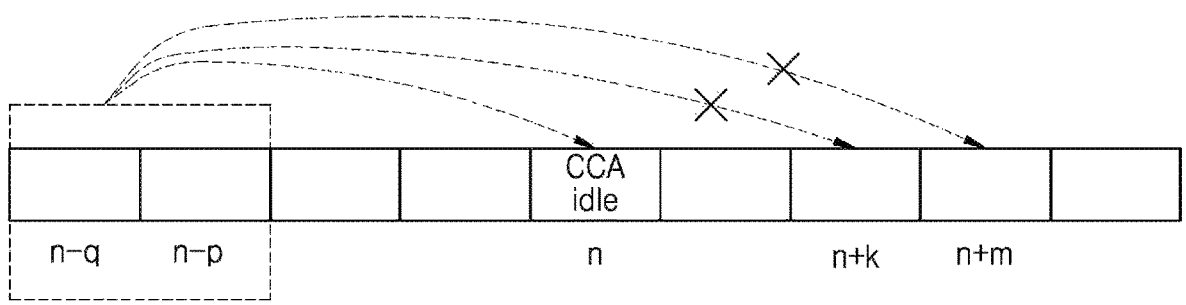
FIG. 19 schematically illustrates a diagram of a UE transmitting a HARQ-ACK according to a carrier sensing result according to an embodiment of the disclosure.

For example, if the UE performs carrier sensing in the slot n and the result is idle, the UE transmits a HARQ-ACK of downlink slots n−p and n−q in the slot n, and then the UE does not perform carrier sensing in the slots (n+k) and (n+m), as shown in FIG. 19.

FIG. 19 schematically illustrates a diagram of a UE transmitting a HARQ-ACK according to a carrier sensing result according to an embodiment of the disclosure.

Figure 20:
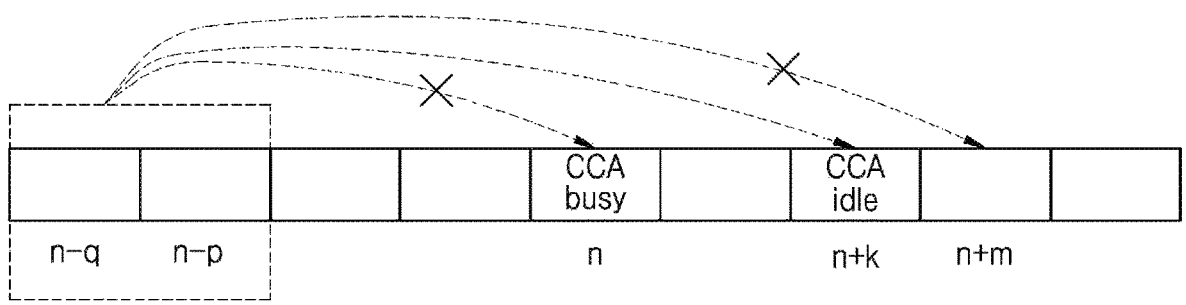
FIG. 20 schematically illustrates a diagram of a UE transmitting a HARQ-ACK according to another carrier sensing result according to an embodiment of the disclosure.

Referring to FIG. 19, if the UE performs carrier sensing in the slot n and the result is busy, the UE performs carrier sensing in the slot (n+k), and if the carrier sensing result is idle, the UE transmits a HARQ-ACK of the downlink slots (n−p) and (n−q) in the slot (n+k), as shown in FIG. 20, and so on, until the slot whose carrier sensing result is idle.

FIG. 20 schematically illustrates a diagram of a UE transmitting a HARQ-ACK according to another carrier sensing result according to an embodiment of the disclosure.

In another implementation of operation 1802, it transmits repeatedly the HARQ-ACK on a HARQ-ACK transmission time unit in the set whose carrier sensing result is idle and all subsequent HARQ-ACK transmission time units in the set (or all subsequent HARQ-ACK transmission time units included in the duration of the carrier sensing).

Figure 21:
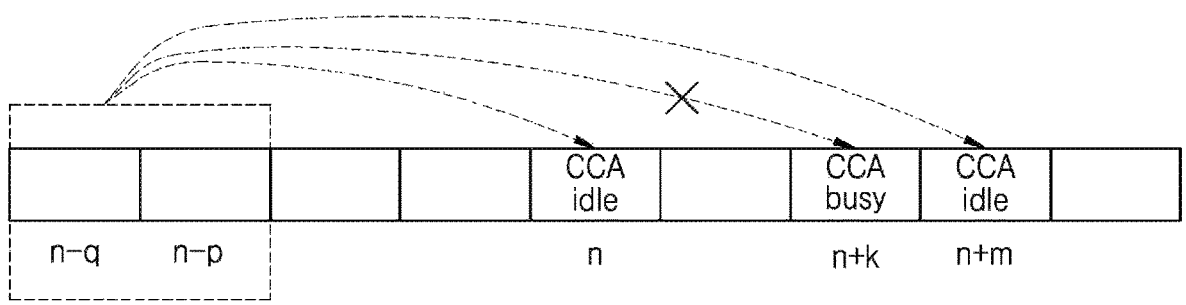
FIG. 21 schematically illustrates a diagram of a UE transmitting a HARQ-ACK according to a carrier sensing result according to an embodiment of the disclosure.

For example, if the UE performs carrier sensing in the slot n and the result is idle, the UE transmits the same HARQ-ACK in the slot n, the slot (n+k), and the slot (n+m), that is, the UE transmits the same HARQ-ACK of the downlink slots (n−q) and (n−p) in the slot n, the slot (n+k) and the slot (n+m), as shown in FIG. 21.

FIG. 21 schematically illustrates a diagram of a UE transmitting a HARQ-ACK according to a carrier sensing result according to an embodiment of the disclosure.

For the serving cell in the licensed band, the type of OFDM symbol in the slot may be indicated by the dynamic SFI in the DCI. The OFDM symbols dynamically indicated by the SFI may include the following three types of OFDM symbol:

the first OFDM symbol type, for which the downlink OFDM symbol is denoted as "D", and the UE may receive the PDCCH, the PDSCH, and the downlink reference signal (for example, CSI-RS) in the downlink OFDM symbol dynamically indicated by the SFI;

the second OFDM symbol type, for which the uplink OFDM symbol in the slot is denoted as "U", and the UE may transmit the PUCCH, the PUSCH, and the uplink reference signal (for example, SRS) in the uplink OFDM symbol dynamically indicated by the SFI;

the third OFDM symbol type, for which the flexible OFDM symbol in the slot is denoted as "X", except for a downlink OFDM symbol or an uplink OFDM symbol indicated by the DCI for allocating a PDSCH or PUSCH, the UE neither receives the PDCCH, the PDSCH and the downlink reference signal, nor transmits the PUCCH, PUSCH and uplink reference signals in the flexible OFDM symbol indicated by the dynamic SFI, and the detection of the PDCCH may be reduced by indicating the flexible OFDM symbol, thereby saving power consumption of the UE.

In the disclosure, it is proposed that for a serving cell within an unlicensed band, the type of OFDM symbol in the slot may be indicated by dynamic SFI in the DCI. The OFDM symbol dynamically indicated by the SFI may include a fourth OFDM symbol type in addition to the above three OFDM symbol types.

A flowchart of a method of transmitting an OFDM symbol performed at the base station side according to an embodiment of the disclosure will be specifically described below with reference to FIG. 22.

Figure 22:
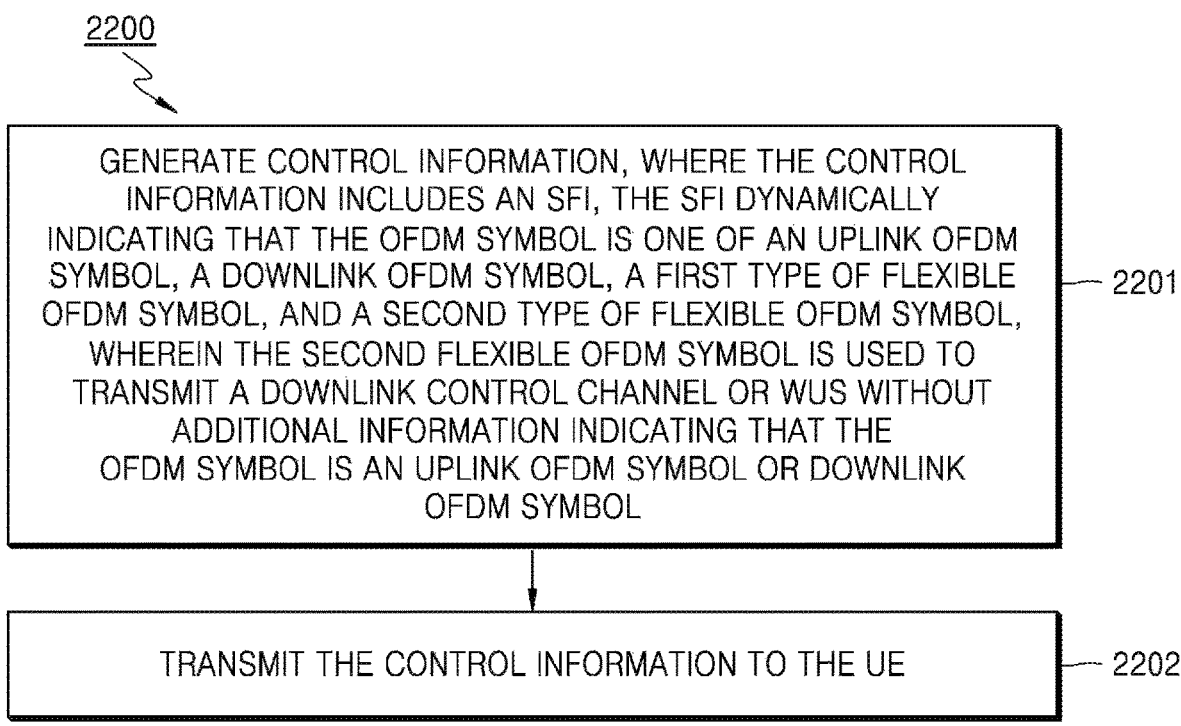
FIG. 22 schematically illustrates a flowchart of a method performed on a base station side for transmitting an OFDM symbol according to an embodiment of the disclosure.

FIG. 22 schematically shows a flowchart of a method 2200 for transmitting an OFDM symbol performed on a base station side according to an embodiment of the disclosure. Referring to FIG. 22, method 2200 may include operations 2201 and 2202.

In operation 2201, the base station generates control information, where the control information includes an SFI, the SFI dynamically indicating which of the following OFDM symbol types each OFDM symbol is:

a downlink OFDM symbol (denoted as "D") for transmitting a downlink control channel (e.g. PDCCH, the same below), a downlink data channel (e.g. PDSCH, the same below) and a downlink reference signal (e.g. CSI-RS, the same below);

an uplink OFDM symbol (denoted to as "U") for receiving an uplink control channel (e.g. PUCCH, the same below), an uplink data channel (e.g. PUSCH, the same below) and an uplink reference signal (e.g. SRS, the same below);

a first type of flexible OFDM symbol in the slot (denoted as "X"), for transmitting a downlink control channel, a downlink data channel and a downlink reference signal as a downlink OFDM symbol or receiving an uplink control channel, an uplink data channel and an uplink reference signal as an uplink OFDM symbol in the case that there is additional indication information indicating the OFDM symbol as a downlink OFDM symbol or an uplink OFDM symbol (for example, the DCI for allocating a PDSCH or PUSCH); and neither transmitting a downlink control channel, a downlink data channel and a downlink reference signal as a downlink OFDM symbol, nor receiving an uplink control channel, an uplink data channel and an uplink reference signal as an uplink OFDM symbol in the case that there is no such additional indication information;

a second type of flexible OFDM symbol in the slot (referred to as "X-1"), for transmitting a downlink control channel, a downlink data channel and a downlink reference signal as a downlink OFDM symbol or receiving an uplink control channel, an uplink data channel and an uplink reference signal as an uplink OFDM symbol in the case that there is such additional indication information; and transmitting a downlink control channel or a wake-up signal (WUS) in the case that there is no such additional indication information.

Since the base station is to perform carrier sensing, the base station may transmit the downlink channel and the signal only if the carrier sensing result is idle. When the carrier sensing result is busy, the base station is not allowed to transmit the downlink channel and the signal. The OFDM symbols of the second flexible OFDM symbol type are those on which the base station wants to transmit the channels and signals. However, the carrier sensing of those OFDM symbols has not yet been performed at the time of transmitting the SFI, so the base station cannot determine whether the carrier sensing results of those OFDM symbols are idle, and therefore it cannot indicate those OFDM symbols in the SFI as downlink OFDM symbols. If the carrier sensing result of the base station is idle, the base station may transmit the channel and signal in these OFDM symbols, so the UE shall receive the PDCCH or WUS in these OFDM symbols. For example, the new slot format is added to the format indexes 56 to 255, as defined in Table 3. For example, the index 56 indicates all (X-1), and the index 57 indicates a portion as (X-1) and another portion as X.

TABLE 3

Time Slot Format For Cyclic Prefix Of The Disclosure

| | OFDM Symbol In Slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |

TABLE 3-continued

Time Slot Format For Cyclic Prefix Of The Disclosure

| Format | \multicolumn{14}{c}{OFDM Symbol In Slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | X | X | U | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56 | X-1 | X-1 | X-1 | X-1 | X-1 | X-1 | X-1 | X-1 | X-1 | X-1 | X-1 | X-1 | X-1 | X-1 |
| 57 | X-1 | X-1 | X-1 | X-1 | X-1 | X-1 | X-1 | X | X | X | X | X | X | X |
| 58-255 | \multicolumn{14}{c}{reserved} | | | | | | | | | | | | | |

In operation 2202, the base station transmits the control information to the UE.

A flowchart of a method of transmitting an OFDM symbol performed on the UE side according to an embodiment of the disclosure will be specifically described below with reference to FIG. 23.

Figure 23:
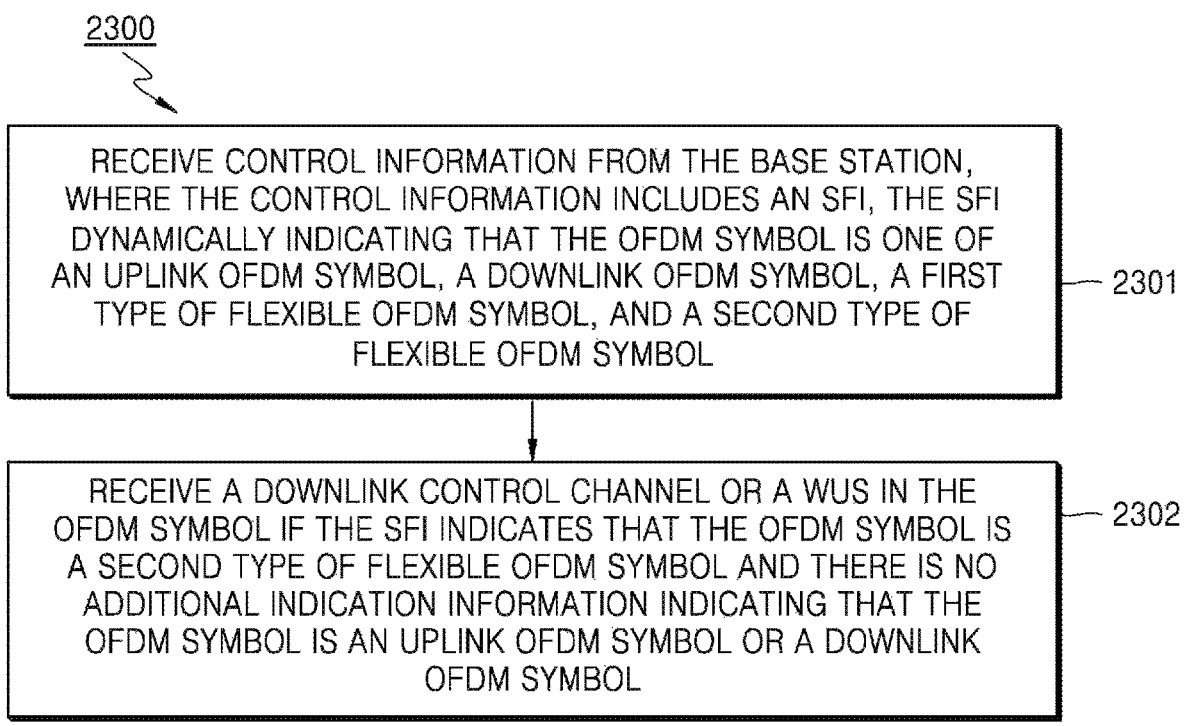
FIG. 23 schematically illustrates a flowchart of a method performed on a UE side for transmitting an orthogonal frequency division multiplexing (OFDM) symbol according to an embodiment of the disclosure.

FIG. 23 schematically shows a flowchart of a method 2300 for transmitting an OFDM symbol performed on a UE side according to an embodiment of the disclosure. Referring to FIG. 23, method 2300 may include operations 2301 and 2302.

In operation 2301, the UE receives control information from the base station, where the control information includes an SFI, the SFI dynamically indicating which of the following OFDM symbol types each OFDM symbol is:

a downlink OFDM symbol for receiving a downlink control channel, a downlink data channel and a downlink reference signal;

an uplink OFDM symbol for transmitting an uplink control channel, an uplink data channel and an uplink reference signal;

a first type of flexible OFDM symbol in the slot, for: receiving a downlink control channel, a downlink data channel and a downlink reference signal as a downlink OFDM symbol or transmitting an uplink control channel, an uplink data channel and an uplink reference signal as an uplink OFDM symbol in the case that there is additional indication information indicating the OFDM symbol as a downlink OFDM symbol or an uplink OFDM symbol (for example, the DCI for allocating a PDSCH or a PUSCH); and neither receiving a downlink control channel, a downlink data channel and a downlink reference signal as a downlink OFDM symbol, nor transmitting an uplink control channel, an uplink data channel and an uplink reference signal as an uplink OFDM symbol in the case that there is no such additional indication information;

a second type of flexible OFDM symbol in the slot, for: receiving a downlink control channel, a downlink data channel and a downlink reference signal as a downlink OFDM symbol or transmitting an uplink control channel, an uplink data channel and an uplink reference signal as an uplink OFDM symbol in the case that there is such additional indication information; and receiving a downlink control channel or WUS in the case that there is no such additional indication information.

In an embodiment of the disclosure, the UE may dynamically indicate the type of OFDM symbol in the slot by receiving the SFI in the control information (e.g. DCI) in the common search space.

In operation 2302, in the case where the SFI indicates that the OFDM symbol is a second flexible OFDM symbol and there is no additional indication information indicating that the OFDM symbol is an uplink OFDM symbol or a downlink OFDM symbol, the UE receives a downlink control channel or a WUS in the OFDM symbol; and if there is the additional indication information, the UE receives in the OFDM symbol, a downlink control channel, a downlink data channel and a downlink reference signal (the indication information indicating that the OFDM The symbol is a downlink OFDM symbol), or transmits an uplink control channel, an uplink data channel, and an uplink reference signal (the indication information indicating that the OFDM symbol is an uplink OFDM symbol).

Hereinafter, a method in which a UE receives a PDCCH, a PDSCH and a downlink reference signal in a serving cell of an unlicensed band and a UE transmits a PUCCH, a PUSCH and an uplink reference signal in a serving cell of an unlicensed band will be described.

First, the method of receiving a PDCCH on a serving cell in an unlicensed band is described.

If the UE is configured to detect the PDCCH on a control resource set, the control resource set is distributed over one or more OFDM symbols, and the information (e.g. the SFI) in the DCI (e.g. DCI format 2-0, and the DCI is Group-common) received by the UE indicates that the one or more OFDM symbols are downlink OFDM symbols, the UE receives the PDCCH on the control resource set. For example, the UE is configured to detect the PDCCH on a control resource set A, the control resource set A is distributed over the first OFDM symbol and the second OFDM symbol of the slot n, and the information in the DCI format 2-0 received by the UE indicates that the first OFDM symbol and the second OFDM symbol of the slot n are both downlink OFDM symbols, the UE detects the PDCCH on the control resource set A. The indication is applicable to the case where the carrier sensing result of the base station is idle when the base station transmits the SFI to the UE, and the channel occupation time of the base station covers all the OFDM symbols over which the control resource set is distributed according to the carrier sensing result. For example, the base station performs carrier sensing in the slot (n−k), and the channel occupation time is the slots (n−k), (n−k+1), . . . , n, and base station transmits the SFI to the UE in the slot (n−k), indicating all OFDM symbols of slot n are downlink OFDM symbols.

If the UE is configured to detect the PDCCH on a control resource set, the control resource set is distributed over one or more OFDM symbols, and the information (e.g. the SFI) in the DCI (e.g. DCI format 2-0, and the DCI is Group-common) received by the UE indicates that one or more OFDM symbols are second flexible OFDM symbols, the UE receives the PDCCH on the control resource set. For example, the UE is configured to detect the PDCCH on a control resource set A, the control resource set A is distributed over the first OFDM symbol and the second OFDM symbol of the slot n, and the information in the DCI format 2-0 received by the UE indicates that the first OFDM symbol and the second OFDM symbol of the slot n are both the second type of flexible OFDM symbols, the UE detects the PDCCH on the control resource set A. The indication is applicable to the case where the carrier sensing result of the base station is busy when the base station transmits the SFI to the UE and the base station does not know when the carrier sensing result will be idle, or the carrier sensing result of the base station is idle, but the channel occupation time of the base station cover all the OFDM symbols over which the control resource set is distributed according to the carrier sensing result. For example, the base station performs carrier sensing in slot n−k, and the channel occupation time is the slots (n−k) and (n−k+1), the UE transmits the SFI in the slot (n−k) to the UE, the base station does not know whether the channel may be occupied in the slot n and the base station intends to transmit data to the UE in the slot n.

The structure of a base station according to an embodiment of the disclosure will be described below with reference to FIG. 24.

Figure 24:
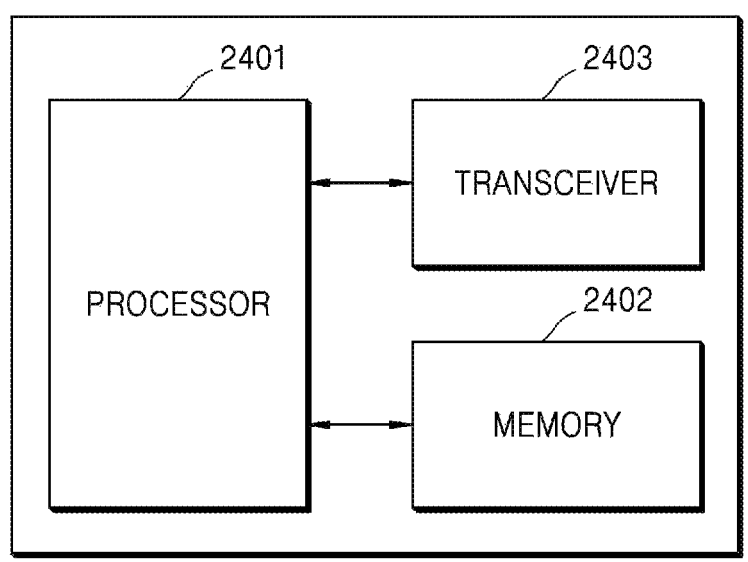
FIG. 24 schematically illustrates a structural diagram of a base station according to an embodiment of the disclosure.

FIG. 24 schematically illustrates a schematic structural diagram of a base station 2400 according to an embodiment of the disclosure.

The base station 2400 may be used to perform the method 100 described with reference to FIG. 1, the method 1600 described with reference to FIG. 16, or the method 2200 described with reference to FIG. 22.

Referring to FIG. 24, the base station 2400 includes a processing unit or processor 2401, which may be a single unit or a combination of a plurality of units for performing different steps of the method; a memory 2402 in which computer-executable instructions are stored, which instructions, when executed by the processor 2401, cause the base station 2400 to perform the method 100, method 1600, or method 2200; and a transceiver 2403 connected to the processor 2401 and transmit and/or receive a signal. For the sake of simplicity, only the schematic structure of the base station according to an embodiment of the disclosure will be described herein, and the details previously described in the method 100 described with reference to FIG. 1, the method 1600 described with reference to FIG. 16 or the method 2200 described with reference to FIG. 22 is omitted.

In an embodiment of the disclosure in which the instructions, when executed by the processor 2401, cause the base station 2400 to perform the method 100, the instructions cause the base station 2400 to perform the following operations:

transmitting, to a UE, information on frequency domain resources of at least one subband on which the carrier sensing is to be performed;

performing carrier sensing on the at least one subband;

allocating idle resources in one or more subbands to the UE;

transmitting to the UE control information indicating the resources allocated to the UE In an embodiment of the disclosure in which the instructions, when executed by the processor 2401, cause the base station 2400 to perform the method 1600, the instructions cause the base station 2400 to perform the following operations:

configuring, for one and the same downlink slot group, a set of a plurality of HARQ-ACK transmission time units for a UE, such that the UE can transmit a HARQ-ACK corresponding to the downlink slot group on one or more HARQ-ACK transmission time units in the set; and transmitting a configuration of the set to the UE.

In an embodiment of the disclosure in which the instructions, when executed by the processor 2401, cause the base station 2400 to perform the method 2200, the instructions cause the base station 2400 to perform the following operations:

generating control information, the control information including an SFI indicating that the OFDM symbol is one of an uplink OFDM symbol, a downlink OFDM symbol, a first type of flexible OFDM symbol and a second flexible OFDM symbol, wherein the second type of flexible OFDM symbol is used to transmit a downlink control channel or a wake-up signal (WUS) in the case that there is no additional indication information indicating that the OFDM symbol is an uplink OFDM symbol or a downlink OFDM symbol; and transmitting the control information to the UE.

The structure of the UE according to an embodiment of the disclosure will be described below with reference to FIG. 25.

Figure 25:
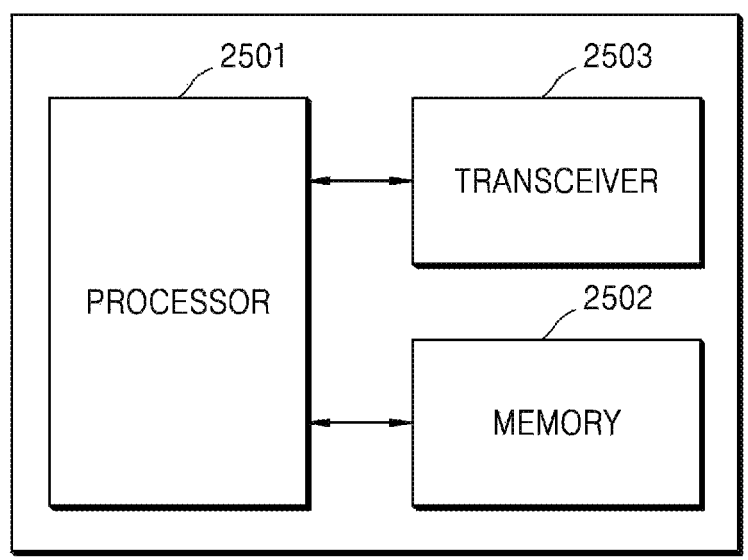
FIG. 25 schematically shows a structural diagram of a UE according to an embodiment of the disclosure.

FIG. 25 schematically illustrates a schematic structural diagram of a UE 2500 according to an embodiment of the disclosure. The UE 2500 may be used to perform the method 1500 described with reference to FIG. 15, the method 1800 described with reference to FIG. 18, or the method 2300 described with reference to FIG. 23.

Referring to FIG. 25, the UE 2500 includes a processing unit or processor 2501, which may be a single unit or a combination of a plurality of units for performing different steps of the method; a memory 2502 in which computer executable instructions are stored, which instructions, when executed by the processor 2501, cause the UE 2500 to perform the method 1500, method 1800, or method 2300; and a transceiver 2503 connected to the processor 2401 and transmit and/or receive a signal. For the sake of simplicity, only the schematic structure of the UE according to an embodiment of the disclosure will be described herein, and the details previously described in the method 1500 described with reference to FIG. 15, the method 1800 described with reference to FIG. 18 or the method 2300 described with reference to FIG. 23 is omitted.

In an embodiment of the disclosure in which the instructions, when executed by the processor 2501, cause the UE 2500 to perform the method 1500, the instructions cause the UE 2500 to perform the following operations:

receiving, from the base station, information on frequency domain resources of at least one subband on which the carrier sensing is to be performed by the base station; and receiving control information transmitted from the base station, the control information indicating idle resources in the one or more subbands allocated by the base station to the UE.

In an embodiment of the disclosure in which the instructions, when executed by the processor 2501, cause the UE 2500 to perform the method 1800, the instructions cause the UE 2500 to perform the following operations:

receiving, from the base station, a configuration of a set of a plurality of HARQ-ACK transmission time units, wherein a HARQ-ACK transmitted on the plurality of HARQ-ACK transmission time units in the set is corresponding to the same downlink slot group;

transmitting the HARQ-ACK on one or more HARQ-ACK transmission time units within the set according to the received configuration.

In an embodiment of the disclosure in which the instructions, when executed by the processor 2501, cause the UE 2500 to perform the method 2300, the instructions cause the UE 2500 to perform the following operations:

receiving control information from a base station, the control information including SFI indicating that the OFDM symbol is one of an uplink OFDM symbol, a downlink OFDM symbol, a first type of flexible OFDM symbol and a second type of flexible OFDM symbol;

receiving a downlink control channel or WUS in the OFDM symbol if the SFI indicates that the OFDM symbol is a second type of flexible OFDM symbol and there is no additional indication information indicating that the OFDM symbol is an uplink OFDM symbol or a downlink OFDM symbol.

The program running on the device according to the disclosure may be a program that causes a computer to implement the functions of the embodiments of the disclosure by controlling a central processing unit (CPU). The program or information processed by the program may be temporarily stored in a volatile memory (such as a random access memory RAM), a hard disk drive (HDD), a non-volatile memory (such as a flash memory), or other memory system.

A program for realizing the functions of the embodiments of the disclosure may be recorded on a computer readable recording medium. The corresponding functions may be realized by causing a computer system to read programs recorded on the recording medium and execute the programs. The phrase "computer system" used herein may be a computer system embedded in the device, and may include an operating system or hardware (such as a peripheral device). The "computer readable recording medium" may be a semiconductor recording medium, an optical recording medium, a magnetic recording medium, a recording medium of a short-term dynamic storage program, or any other recording medium readable by a computer.

The various features or functional blocks used in the device in the above embodiments may be implemented or executed by circuitry (e.g., monolithic or multi-chip integrated circuits). Circuitry designed to perform the functions described in this specification may include general purpose processors, digital signal processors (DSPs), application specific integrated circuits (ASICs), field programmable gate arrays (FPGAs), or other programmable logic devices, discrete gates or transistor logic, discrete hardware components, or any combination of the above. A general purpose processor may be a microprocessor or any existing processor, controller, microcontroller, or state machine. The above circuit may be a digital circuit or an analog circuit. One or more embodiments of the disclosure may also be implemented using new integrated circuit technologies in the context of the new integrated circuit technologies that replace existing integrated circuits due to advances in semiconductor technology.

As above, the embodiments of the disclosure have been described in detail with reference to the accompanying drawings. However, the specific structure is not limited to the above embodiments, and the disclosure also includes any design modifications not departing from the spirit of the disclosure. In addition, various modifications may be made to the disclosure within the scope of the claims, and the embodiments obtained by appropriately combining the technical means disclosed in the different embodiments are also included in the scope of the disclosure. Further, the components having the same effects described in the above embodiments may be substituted for each other.

While the disclosure has been shown and described with reference to various embodiments thereof, it will be understood by those skilled in the art that various changes in form and details may be made therein without departing from spirit and scope of the disclosure as defined by the appended claims and their equivalents.

What is claimed is:

1. A method of transmitting data by a base station, comprising:

transmitting, to a user equipment (UE), information related to frequency domain resources of at least one subband on which carrier sensing is to be performed, each of the at least one subband being a part of a bandwidth of a carrier and the at least one subband has a bandwidth of integer multiple of N number of physical resource blocks (PRBs), wherein N is a positive integer;

performing carrier sensing on the at least one subband in response to transmitting the information related to the frequency domain resources of the at least one subband;

allocating idle resources in a first subband of the at least one subband to the UE based on a result of the carrier sensing, wherein the idle resources are allocated in a unit determined based on a subset of the N number of PRBs; and transmitting, to the UE, control information indicating the idle resources allocated to the UE.

2. The method of claim 1, further comprising:

configuring, for a single downlink slot group, a set of a plurality of hybrid automatic repeat request-acknowledgement (HARQ-ACK) transmission time units for the UE; and transmitting a configuration of the set to the UE, wherein the UE transmits a HARQ-ACK corresponding to the downlink slot group on one or more HARQ-ACK transmission time units in the set.

3. The method of claim 1, further comprising:

generating the control information, the control information including slot format information (SFI) indicating that an orthogonal frequency division multiplexing (OFDM) symbol corresponds to one of an uplink OFDM symbol, a downlink OFDM symbol, a first type of flexible OFDM symbol, or a second type of flexible OFDM symbol, wherein the second type of flexible OFDM symbol is used to transmit a downlink control channel or a wake-up signal (WUS) without additional information that indicates that the OFDM symbol corresponds to an uplink OFDM symbol or a downlink OFDM symbol.

4. A non-transitory computer readable medium having instructions stored thereon, the instructions, when executed by a processor, cause the processor to perform the method of claim 1.

5. A method of transmitting data by a user equipment (UE), comprising:

receiving, from a base station, information related to frequency domain resources of at least one subband on which carrier sensing is to be performed by the base station, each of the at least one subband being a part of a bandwidth of a carrier and the at least one subband has a bandwidth of integer multiple of N number of physical resource blocks (PRBs), wherein N is a positive integer; and receiving control information from the base station in response to receiving the information related to the frequency domain resources of the at least one subband, the control information indicating idle resources in a first subband of the at least one subband allocated to the UE by the base station based on a result of the carrier sensing, wherein the idle resources are allocated in a unit determined based on a subset of the N number of PRBs.

6. The method of claim 5, wherein the bandwidth of the at least one subband is determined based on one of:

the number N of PRBs of the at least one subband is preset by a protocol, and a subcarrier spacing of the PRB is determined according to a reference subcarrier spacing;

the number N of PRBs of the at least one subband is preset by a protocol, and the subcarrier spacing of the PRBs is determined by a carrier or a bandwidth part (BWP) of the carrier where the at least one subband is located;

the number N of PRBs of the at least one subband is configured by a higher layer signaling, and the subcarrier spacing of the PRB is determined according to the reference subcarrier spacing;

the number N of PRBs of the at least one subband is configured by the higher layer signaling, and the subcarrier spacing of the PRB is determined by the carrier or the BWP where the at least one subband is located;

the number N of PRBs of the at least one subband is determined by a predetermined correspondence between a number of PRBs configured by the higher layer signaling and the bandwidth of the at least one subband, and the subcarrier spacing of the PRB is determined by the carrier or the BWP where the at least one subband is located; or the number N of PRBs of the at least one subband is equal to a number of PRBs in a resource block group (RBG) that is used for resource allocation in the at least one subband, wherein the RBG is a basic unit of frequency domain resource allocation.

7. The method of claim 6, wherein the RBG is determined based on one of:

the RBG is in a basic unit of the at least one subband, wherein PRBs in the RBG are in a single subband on which the carrier sensing is to be performed; or the RBG is in a basic unit of a carrier or a BWP, wherein PRBs in the RBG are in different subbands on which the carrier sensing is to be performed.

8. The method of claim 5, wherein the bandwidth of the at least one subband is predetermined, and wherein, when the bandwidth of the first subband is not an integer multiple of PRBs, the idle resources in the first subband are allocated based on one of:

a first PRB that is located in the first subband and not located across the first subband and a second subband of the at least one subband is allocated based on a carrier sensing result of the first subband; or a second PRB that is located across the first subband and the second subband is allocated based on carrier sensing results of the first subband and the second subband.

9. The method of claim 5, wherein the idle resources in one or more subbands allocated to the UE by the base station are determined based on one of:

resources of individual subbands on which the carrier sensing is to be performed or a bandwidth part (BWP) of a carrier that are separately allocated by the base station;

resources of the individual subbands on which the carrier sensing is to be performed or the BWP are jointly allocated by the base station;

separately or jointly allocated resources of individual subbands on which the carrier sensing is to be performed or the BWP are received from the base station by a higher layer signaling configuration; or separately or jointly allocated resources of individual subbands on which the carrier sensing is to be performed or the BWP are based on different downlink control information (DCI) formats received from the base station.

10. The method of claim 9, wherein, when the resources are jointly allocated, relative positions of the resources allocated in the individual subbands on which the carrier sensing is to be performed or the BWP are identical; or the resources of the individual subbands on which the carrier sensing is to be performed or the BWP are allocated as a whole band.

11. The method of claim 5, wherein data is received from the allocated resources in an order of time domain first and frequency domain next.

12. The method of claim 5, further comprising:
receiving, from the base station, a configuration of a set of a plurality of hybrid automatic repeat request-acknowledgement (HARQ-ACK) transmission time units, wherein a HARQ-ACK transmitted on the plurality of HARQ-ACK transmission time units in the set corresponding to the same downlink slot group; and
transmitting a HARQ-ACK on one or more HARQ-ACK transmission time units in the set according to the received configuration.

13. The method of claim 12, further comprising, before transmitting the HARQ-ACK, sequentially performing carrier sensing in the HARQ-ACK transmission time units in the set.

14. The method of claim 13, wherein the transmitting of the HARQ-ACK further comprises:
if a carrier sensing result of a first HARQ-ACK transmission time unit in the set is idle, transmitting the HARQ-ACK in the first HARQ-ACK transmission time unit without performing carrier sensing in subsequent HARQ-ACK transmission time units;
if the carrier sensing result of the first HARQ-ACK transmission time unit is busy, performing carrier sensing in a next HARQ-ACK transmission time unit until a HARQ-ACK transmission time unit whose carrier sensing result is idle is found to transmit the HARQ-ACK without performing carrier sensing in subsequent HARQ-ACK transmission time units;
if the carrier sensing result is busy up to a last HARQ-ACK transmission time unit in the set, not transmitting the HARQ-ACK; or
repeatedly transmitting the HARQ-ACK on a HARQ-ACK transmission time unit in the set whose carrier sensing result is idle and all subsequent HARQ-ACK transmission time units in the set.

15. The method of claim 5, wherein the control information includes slot format information (SFI) indicating that an orthogonal frequency division multiplexing (OFDM) symbol corresponds to one of an uplink OFDM symbol, a downlink OFDM symbol, a first type of flexible OFDM symbol, or a second type of flexible OFDM symbol, and
further comprising receiving a downlink control channel or a wake-up signal (WUS) in the OFDM symbol if the SFI indicates that the OFDM symbol is a second type of flexible OFDM symbol and there is no indication information that indicates the OFDM symbol corresponds to an uplink OFDM symbol or a downlink OFDM symbol.

16. A non-transitory computer readable medium having instructions stored thereon, the instructions, when executed by a processor, cause the processor to perform the method of claim 5.

17. A base station, comprising:
a processor;
a transceiver; and
a memory having computer executable instructions stored thereon, the instructions, when executed by the processor, cause the base station to perform:
transmitting, to a user equipment (UE) using the transceiver, information related to frequency domain resources of at least one subband on which carrier sensing is to be performed, each of the at least one subband being a part of a bandwidth of a carrier and the at least one subband has a bandwidth of integer multiple of N number of physical resource blocks (PRBs), wherein N is a positive integer,
performing carrier sensing on the at least one subband in response to transmitting the information related to the frequency domain resources of the at least one subband,
allocating idle resources in a first subband of the at least one subband to the UE based on a result of the carrier sensing, wherein the idle resources are allocated in a unit determined based on a subset of the N number of PRBs, and
transmitting, to the UE using the transceiver, control information indicating the idle resources allocated to the UE.

18. A user equipment (UE), comprising:
a processor;
a transceiver; and
a memory having computer executable instructions stored thereon, the instructions, when executed by the processor, cause the UE to perform:
receiving, from a base station using the transceiver, information related to frequency domain resources of at least one subband on which carrier sensing is to be performed by the base station, each of the at least one subband being a part of a bandwidth of a carrier and the at least one subband has a bandwidth of integer multiple of N number of physical resource blocks (PRBs), wherein N is a positive integer; and
receiving control information from the base station using the transceiver in response to receiving the information related to the frequency domain resources of the at least one subband, the control information indicating idle resources in a first subband of the at least one subband allocated to the UE by the base station based on a result of the carrier sensing,
wherein the idle resources are allocated in a unit determined based on a subset of the N number of PRBs.

* * * * *